US012661589B2

(12) United States Patent
Ye

(10) Patent No.: US 12,661,589 B2
(45) Date of Patent: Jun. 23, 2026

(54) GAME DATA PROCESSING METHOD AND APPARATUS, DEVICE, STORAGE MEDIUM, AND PROGRAM PRODUCT

(71) Applicant: TENCENT TECHNOLOGY (SHENZHEN) COMPANY LIMITED, Shenzhen (CN)

(72) Inventor: Jin Ye, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 271 days.

(21) Appl. No.: 18/472,216

(22) Filed: Sep. 21, 2023

(65) Prior Publication Data

US 2024/0009571 A1 Jan. 11, 2024

Related U.S. Application Data

(63) Continuation of application No. PCT/CN2022/127925, filed on Oct. 27, 2022.

(30) Foreign Application Priority Data

Jan. 4, 2022 (CN) .......................... 202210016598.8

(51) Int. Cl.
 *A63F 13/58* (2014.01)
 *A63F 13/52* (2014.01)
 *A63F 13/67* (2014.01)
(52) U.S. Cl.
 CPC .............. *A63F 13/58* (2014.09); *A63F 13/52* (2014.09); *A63F 13/67* (2014.09)

(58) Field of Classification Search
 CPC .......... A63F 13/58; A63F 13/52; A63F 13/67; A63F 13/69; A63F 13/822; G06T 13/00
 See application file for complete search history.

(56) References Cited

U.S. PATENT DOCUMENTS

2018/0071632 A1* 3/2018 Takahashi ............... A63F 13/55

FOREIGN PATENT DOCUMENTS

| CN | 107890669 A | 4/2018 |
| CN | 111672124 A | 9/2020 |
| CN | 112076476 A | 12/2020 |

(Continued)

OTHER PUBLICATIONS

The World Intellectual Property Organization (WIPO) International Search Report for PCT/CN2022/127925 Jan. 17, 2023 13 Pages (including translation).

*Primary Examiner* — Thomas H Henry
(74) *Attorney, Agent, or Firm* — Anova Law Group, PLLC

(57) ABSTRACT

This application discloses a game data processing method and apparatus, a device, and a readable storage medium. The method includes displaying a game interface comprising a first virtual building and a second virtual building, wherein the first virtual building is of a first building level, and the second virtual building is of a second building level; generating a first virtual attacking unit corresponding to the first building level to attack the second virtual building; upgrading the second building level of the second virtual building in response to the first virtual attacking unit being eliminated; and generating a second virtual attacking unit to attack the first virtual building based on the upgraded second building level.

20 Claims, 18 Drawing Sheets

(56) References Cited

FOREIGN PATENT DOCUMENTS

| CN | 112337089 A | 2/2021 |
| CN | 114344913 A | 4/2022 |
| JP | 2018042741 A | 3/2018 |

* cited by examiner

Figure 3:
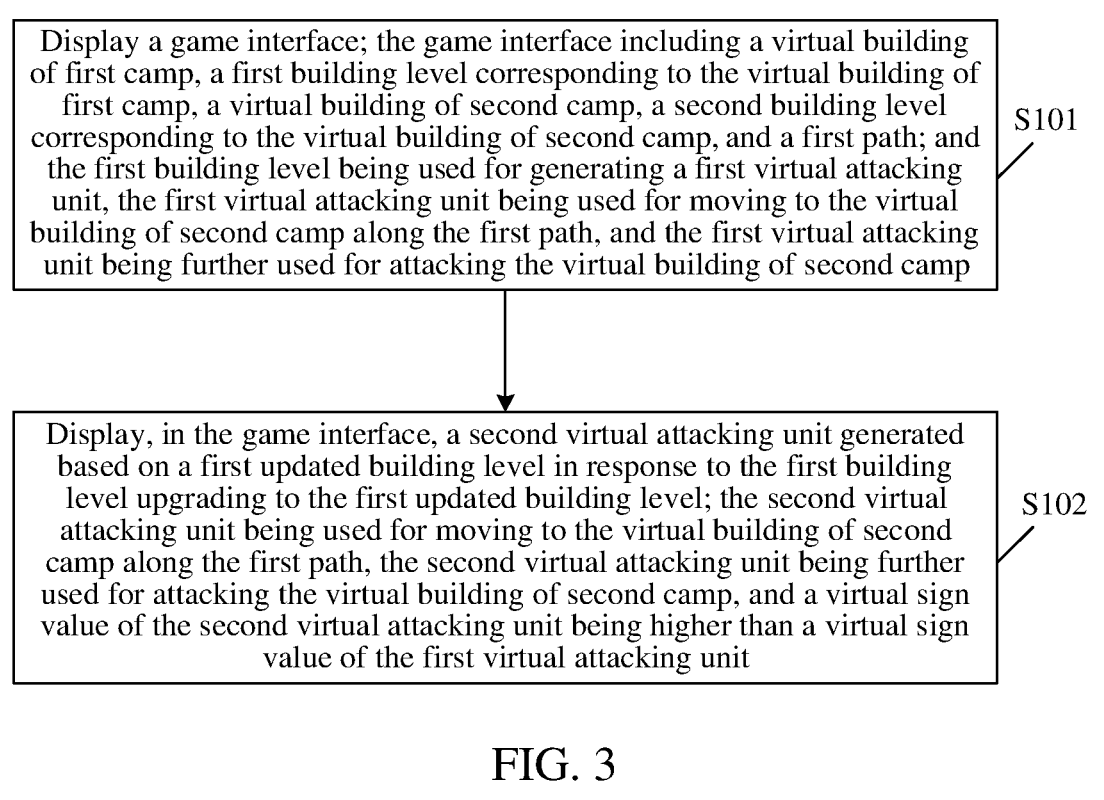

Display a game interface; the game interface including a virtual building of first camp, a first building level corresponding to the virtual building of first camp, a virtual building of second camp, a second building level corresponding to the virtual building of second camp, and a first path; and the first building level being used for generating a first virtual attacking unit, the first virtual attacking unit being used for moving to the virtual building of second camp along the first path, and the first virtual attacking unit being further used for attacking the virtual building of second camp

S101

Display, in the game interface, a second virtual attacking unit generated based on a first updated building level in response to the first building level upgrading to the first updated building level; the second virtual attacking unit being used for moving to the virtual building of second camp along the first path, the second virtual attacking unit being further used for attacking the virtual building of second camp, and a virtual sign value of the second virtual attacking unit being higher than a virtual sign value of the first virtual attacking unit

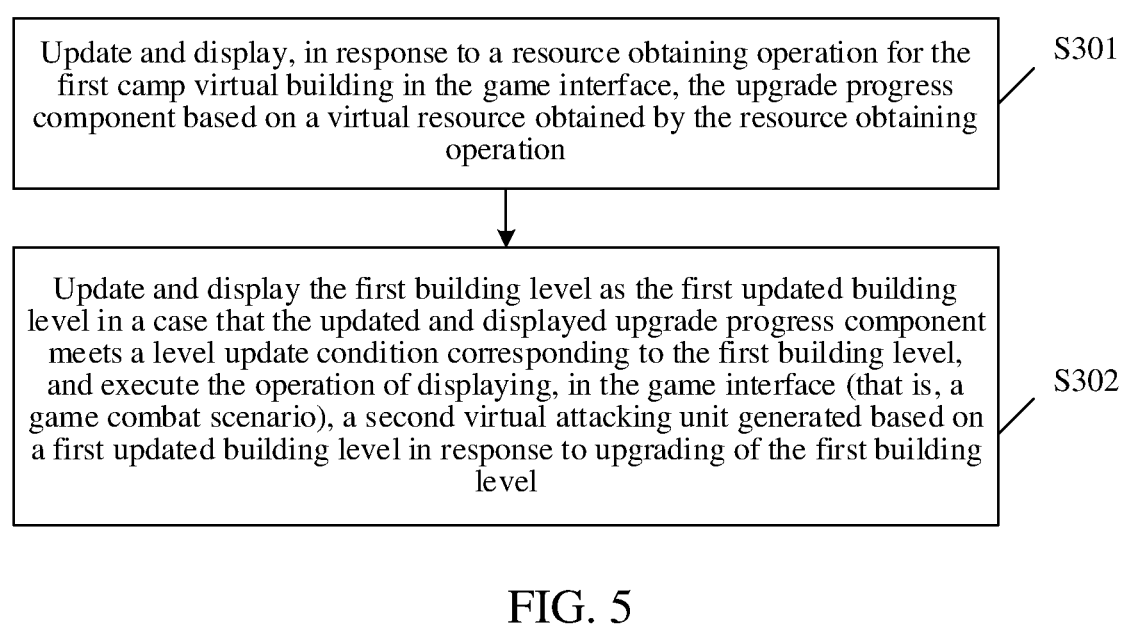

Update and display, in response to a resource obtaining operation for the first camp virtual building in the game interface, the upgrade progress component based on a virtual resource obtained by the resource obtaining operation    S301

Update and display the first building level as the first updated building level in a case that the updated and displayed upgrade progress component meets a level update condition corresponding to the first building level, and execute the operation of displaying, in the game interface (that is, a game combat scenario), a second virtual attacking unit generated based on a first updated building level in response to upgrading of the first building level    S302

FIG. 5

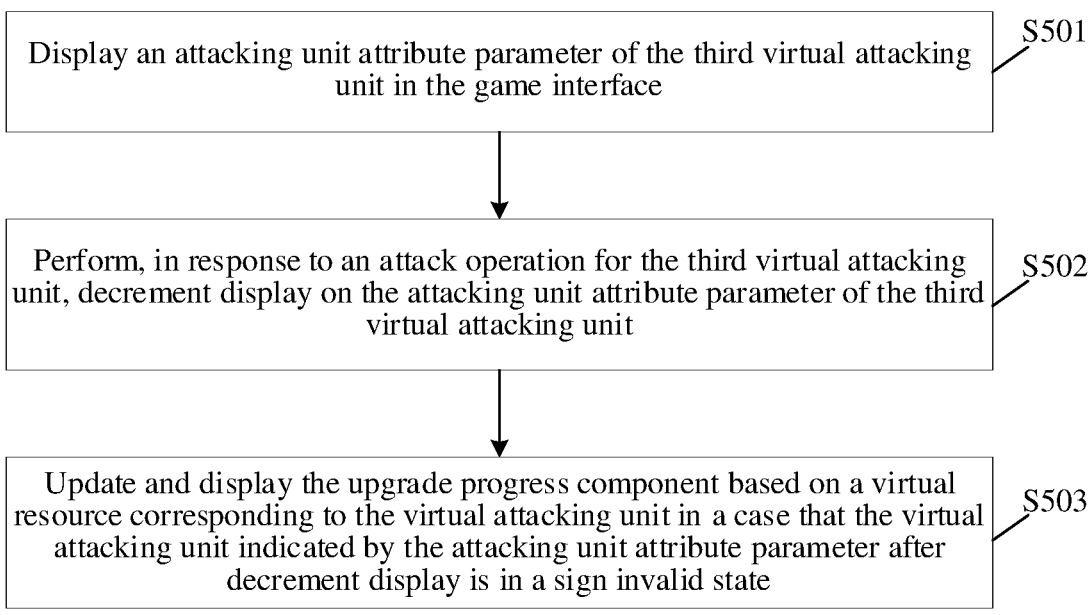

Display an attacking unit attribute parameter of the third virtual attacking unit in the game interface   S501

Perform, in response to an attack operation for the third virtual attacking unit, decrement display on the attacking unit attribute parameter of the third virtual attacking unit   S502

Update and display the upgrade progress component based on a virtual resource corresponding to the virtual attacking unit in a case that the virtual attacking unit indicated by the attacking unit attribute parameter after decrement display is in a sign invalid state   S503

FIG. 7

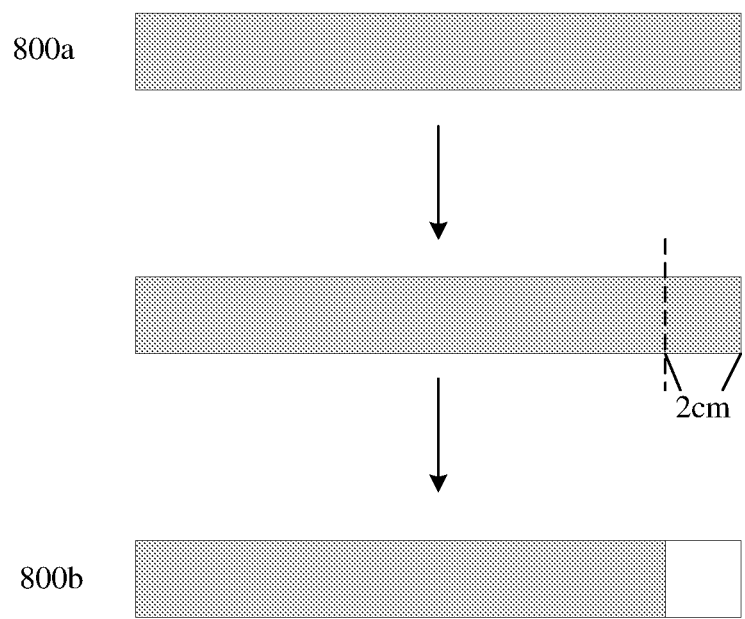

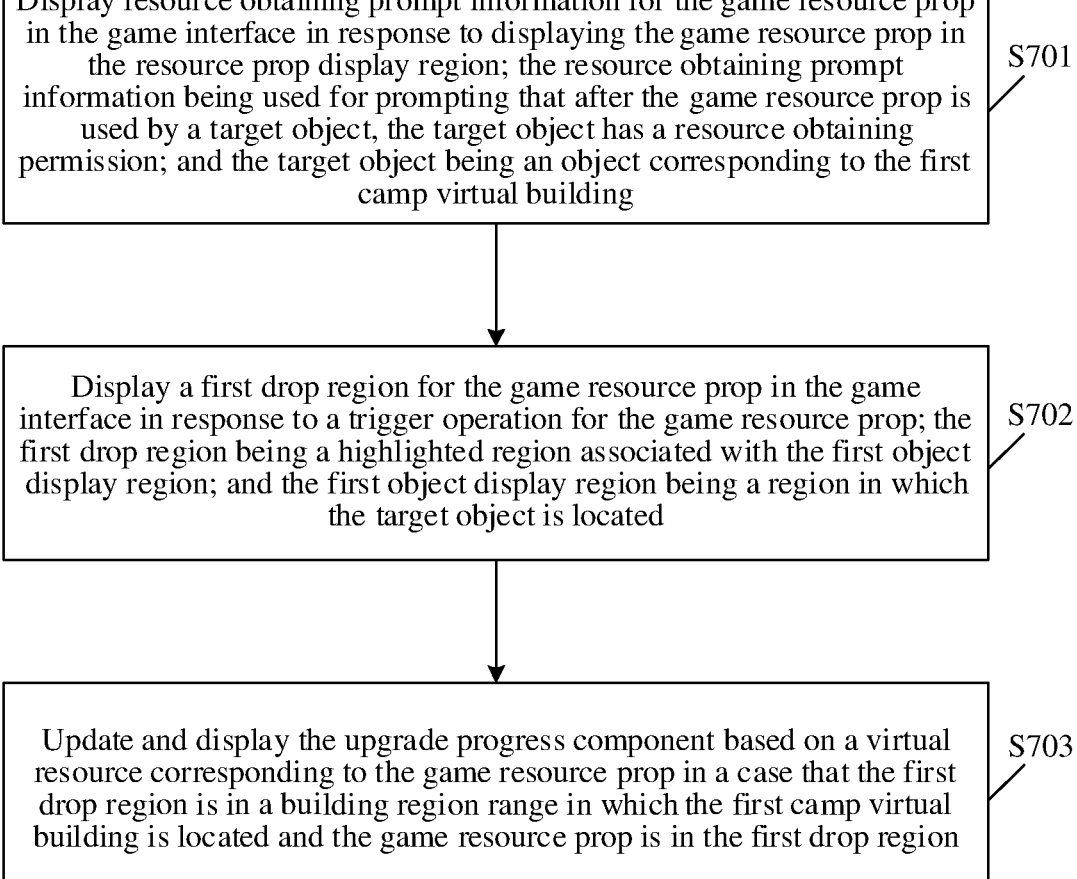

Display resource obtaining prompt information for the game resource prop in the game interface in response to displaying the game resource prop in the resource prop display region; the resource obtaining prompt information being used for prompting that after the game resource prop is used by a target object, the target object has a resource obtaining permission; and the target object being an object corresponding to the first camp virtual building

S701

Display a first drop region for the game resource prop in the game interface in response to a trigger operation for the game resource prop; the first drop region being a highlighted region associated with the first object display region; and the first object display region being a region in which the target object is located

S702

Update and display the upgrade progress component based on a virtual resource corresponding to the game resource prop in a case that the first drop region is in a building region range in which the first camp virtual building is located and the game resource prop is in the first drop region

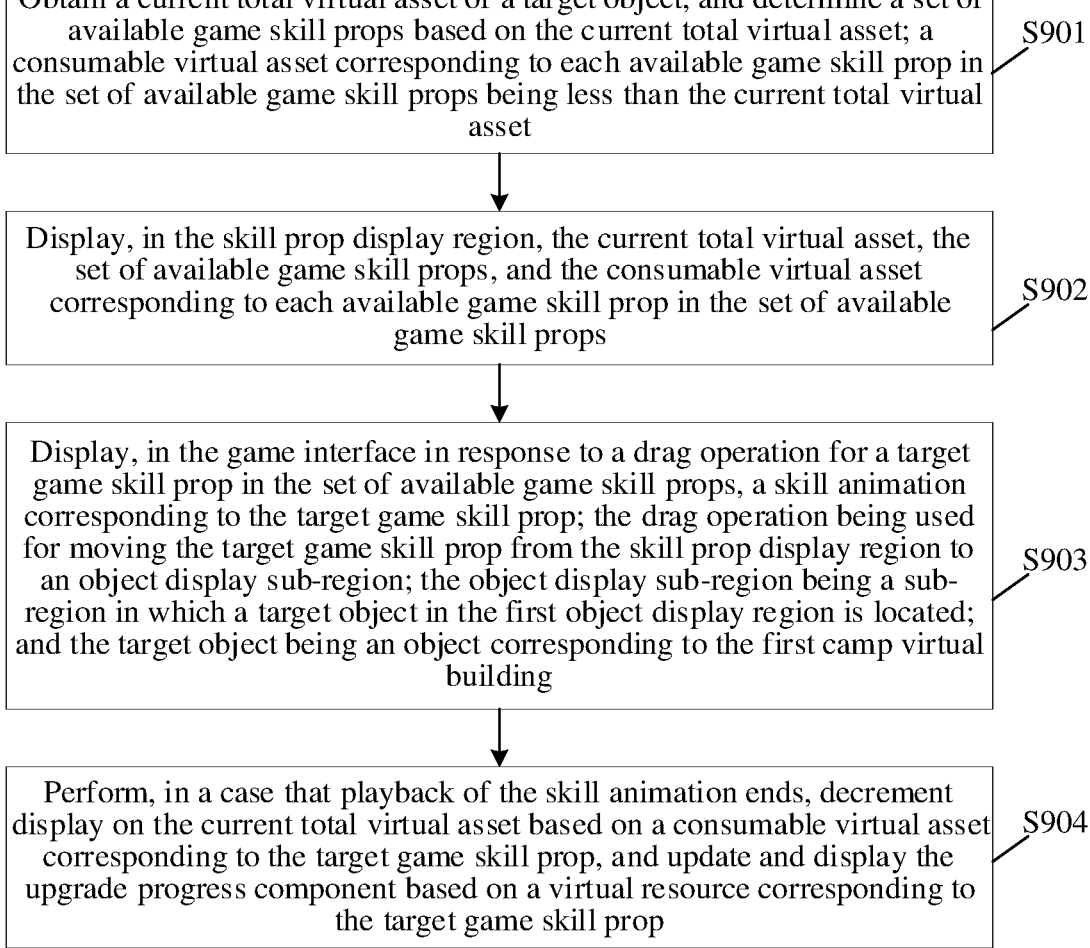

Obtain a current total virtual asset of a target object, and determine a set of available game skill props based on the current total virtual asset; a consumable virtual asset corresponding to each available game skill prop in the set of available game skill props being less than the current total virtual asset   S901

Display, in the skill prop display region, the current total virtual asset, the set of available game skill props, and the consumable virtual asset corresponding to each available game skill prop in the set of available game skill props   S902

Display, in the game interface in response to a drag operation for a target game skill prop in the set of available game skill props, a skill animation corresponding to the target game skill prop; the drag operation being used for moving the target game skill prop from the skill prop display region to an object display sub-region; the object display sub-region being a sub-region in which a target object in the first object display region is located; and the target object being an object corresponding to the first camp virtual building   S903

Perform, in a case that playback of the skill animation ends, decrement display on the current total virtual asset based on a consumable virtual asset corresponding to the target game skill prop, and update and display the upgrade progress component based on a virtual resource corresponding to the target game skill prop   S904

FIG. 13

GAME DATA PROCESSING METHOD AND APPARATUS, DEVICE, STORAGE MEDIUM, AND PROGRAM PRODUCT

RELATED APPLICATIONS

This application is a continuation of PCT Application No. PCT/CN2022/127925, filed on Oct. 27, 2022, which in turn claims priority to Chinese Patent Application No. 202210016598.8, entitled "GAME DATA PROCESSING METHOD AND APPARATUS, DEVICE, AND READABLE STORAGE MEDIUM" filed with the China National Intellectual Property Administration on Jan. 4, 2022. The two applications are both incorporated herein by reference in their entirety.

FIELD OF THE TECHNOLOGY

This application relates to the field of computer technologies, and in particular, to game data processing.

BACKGROUND OF THE DISCLOSURE

With rapid development of related technologies of electronic devices and the Internet, the game industry has developed at a rapid pace. Especially, since smart terminals such as smartphones and tablets have become widely available, the game industry has advanced in many aspects.

Currently, in certain games, in a combat (for example, a player versus player (PVP) tower defense game), a presentation form of a combat interface is single, and a player cannot formulate an accurate game strategy by using the single combat presentation interface, which greatly impairs the user experience of a combat game.

SUMMARY

Embodiments of this application provide a game data processing method and apparatus, a device, and a readable storage medium, so that game difficulty level in a combat can be quantified and presented in a combat interface to enrich presentation forms of the combat interface.

One aspect of the embodiments of this application provides a game data processing method, including: displaying a game interface comprising a first virtual building and a second virtual building, wherein the first virtual building is of a first building level, and the second virtual building is of a second building level; generating a first virtual attacking unit corresponding to the first building level to attack the second virtual building; upgrading the second building level of the second virtual building in response to the first virtual attacking unit being eliminated; and generating a second virtual attacking unit to attack the first virtual building based on the upgraded second building level.

Another aspect of the embodiments of this application provides a computer device, including: a processor and a memory, the memory storing a computer program, and when the computer program is executed by the processor, the processor performing the method in the embodiments of this application.

Another aspect of the embodiments of this application provides a non-transitory computer readable storage medium, the computer readable storage medium storing a computer program, the computer program including program instructions, and the program instructions being executed by a processor to perform the method in the embodiments of this application.

In one embodiment consistent with this disclosure, when a game is started on a target object, a game interface for a combat may be displayed in a game application, and a virtual building of a first camp, a first building level corresponding to the virtual building of the first camp, a virtual building of a second camp, a second building level corresponding to the virtual building of the second camp, and a first path are displayed in a combat interface. The first building level is used for generating a first virtual attacking unit, the first virtual attacking unit is used for moving to the virtual building of the second camp along the first path, and the first virtual attacking unit is further used for attacking the virtual building of the second camp. When the first building level is upgraded to the first updated building level, a second virtual attacking unit generated based on the first updated building level may be displayed in the game interface, the second virtual attacking unit is used for moving to the virtual building of the second camp along the first path, the second virtual attacking unit is further used for attacking the virtual building of the second camp, and a virtual health value of the second virtual attacking unit is higher than a virtual health value of the first virtual attacking unit.

It may be understood that, when a virtual health value of a virtual attacking unit is higher, it becomes more difficult to attack the virtual attacking unit so that the virtual attacking unit is in a health depleted state, and the virtual attacking unit has more time to attack the virtual building of the second camp, thereby making the game more difficult. That is, in this application, a building level of a camp virtual building may be associated with game difficulty level (a virtual health value of a virtual attacking unit may be used for representing game difficulty level). The first building level of the virtual building of the first camp is used for quantifying a virtual health value of the first or the second virtual attacking unit that attacks the virtual building of the second camp. Therefore, current game difficulty level (for example, a higher first building level indicates a higher virtual life value of a virtual attacking unit that attacks the virtual building of the second camp, and higher game difficulty level of a camp corresponding to the virtual building of the second camp) may be visually presented in a game interface, and a service object (which may be understood as a player) corresponding to the virtual building of the second camp may be assisted in formulating a more accurate game strategy. In conclusion, in this application, game difficulty level in a combat may be quantified and presented in a combat interface, thereby enriching presentation forms of the combat, and improving convenience of making a game strategy by a service object.

BRIEF DESCRIPTION OF THE DRAWINGS

FIG. 3 is a schematic flowchart of a game data processing method according to an embodiment of this application.

FIG. 5 is a schematic flowchart of updating and displaying a building level according to an embodiment of this application.

FIG. 7 is a schematic flowchart of updating and displaying an upgrade progress component according to an embodiment of this application.

FIG. 8 is a schematic diagram of decrement display of an attacking unit attribute parameter according to an embodiment of this application.

FIG. 10 is a schematic flowchart of updating and displaying an upgrade progress component according to an embodiment of this application.

FIG. 13 is a schematic flowchart of updating and displaying an upgrade progress component according to an embodiment of this application.

DESCRIPTION OF EMBODIMENTS

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without making creative efforts shall fall within the protection scope of this application.

Figure 1:
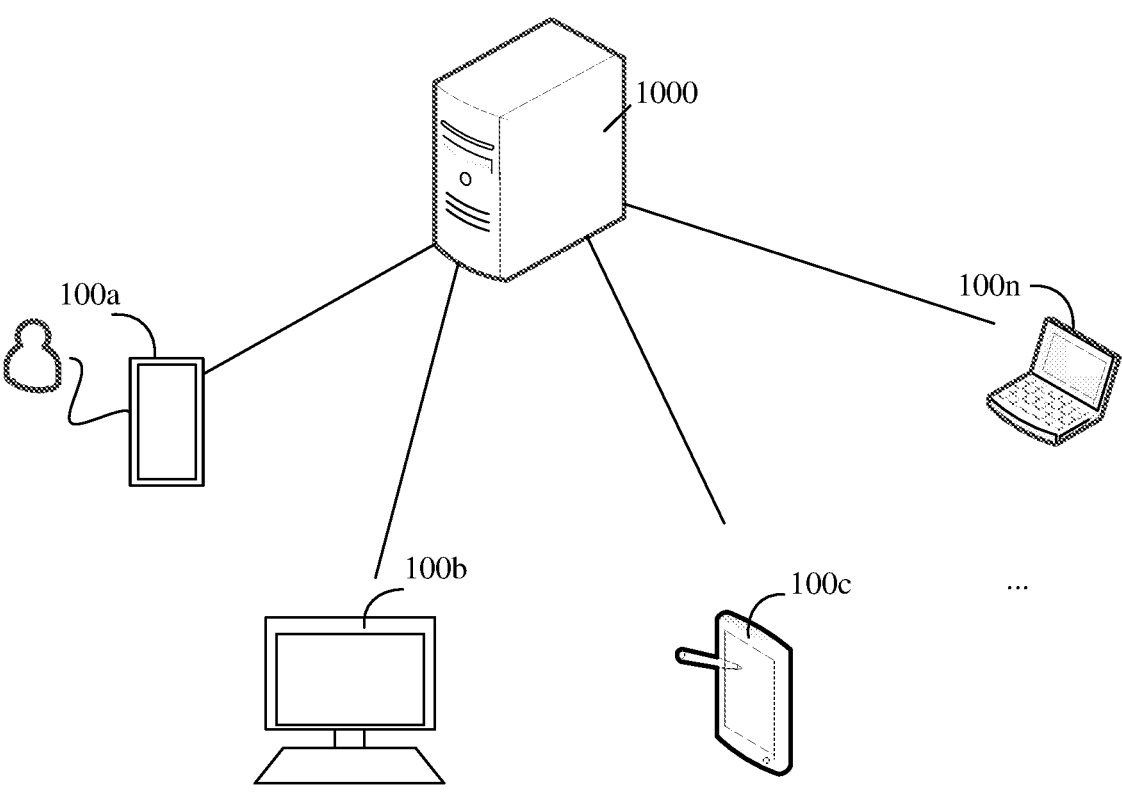
FIG. 1 is a network architecture diagram according to an embodiment of this application.

Referring to FIG. 1, FIG. 1 is a diagram of a network architecture according to an embodiment of this application. As shown in FIG. 1, the network architecture may include a service server 1000 and a terminal device cluster. The terminal device cluster may include one or more terminal devices. The quantity of the terminal devices is not limited herein. As shown in FIG. 1, multiple terminal devices may include a terminal device 100a, a terminal device 100b, a terminal device 100c, . . . , and a terminal device 100n. As shown in FIG. 1, the terminal device 100a, the terminal device 100b, the terminal device 100c, . . . , and the terminal device 100n may separately establish a network connection to the service server 1000, so that each terminal device can exchange data with the service server 1000 by using the network connection.

It may be understood that a target application may be installed on each terminal device shown in FIG. 1. When the target application runs in each terminal device, data interaction may be separately performed with the service server 1000 shown in FIG. 1, so that the service server 1000 can receive service data from each terminal device. The target application may include an application that has a function of displaying data information such as a text, an image, an audio, and a video. For example, the application may be an entertainment application (for example, a PVP tower defense game application), and the entertainment application may be used by a user to perform game entertainment. The application may be an independent application, or may be an embedded sub-application in an application (for example, a social application, an educational application, or a multimedia application), which is not limited herein.

In one embodiment, one terminal device may be selected from multiple terminal devices as a target terminal device. The terminal device may include: an intelligent terminal that carries a multimedia data processing function (for example, a video data playback function, a music data playback function, and a text data playback function), such as a smartphone, a tablet computer, a laptop computer, a desktop computer, a smart TV, a smart sound box, a desktop computer, a smart watch, a smart car, an intelligent voice interaction device, and a smart home appliance, but is not limited thereto. For example, in one embodiment, the terminal device 100a shown in FIG. 1 may be used as the target terminal device, and the target terminal device may be integrated with the target application. In this case, the target terminal device may exchange data with the service server 1000 by using the target application. The service server 1000 in this application may obtain service data according to these applications. For example, the service server 1000 may obtain service data by using a bound account of a user. The bound account may be an account bound by the user in the application. The user may log in to an application, upload data, obtain data, and the like by using a bound account corresponding to the user, and the service server may also obtain a login status and uploaded data of the user, send data to the user, and the like by using the bound account corresponding to the user. For example, when the user runs a game application in the terminal device, the service server 1000 may obtain related game data of the user by using a bound account of the service server 1000.

It is to be understood that when the user runs a game application (for example, a PVP tower defense game application), the game application may display a combat interface associated with the user. In the combat interface, there may be included camp virtual buildings in which opposing players in a combat (one of the players may be referred to as a target object and the other player as a contention object) are located respectively (in the combat interface, it may be understood as a game base, which may be presented in the combat in a form of a virtual building). In this application, game difficulty level in the combat may be quantized, and the game difficulty level is associated with a building level of a camp virtual building.

It may be understood that, in one embodiment, a game camp in which the target object is located may be referred to as a first game camp, and a game camp in which the contention object is located may be referred to as a second game camp. In one embodiment, a camp virtual building (which may be referred to as a virtual building of a first camp) used for representing the first game camp may be displayed on the combat interface (which may also be referred to as a game interface), and certainly a camp virtual building used for representing the second game camp (which may be referred to as a virtual building of a second camp, or referred to as a contention camp virtual building or a combat camp virtual building for ease of distinction) may be displayed. In this application, a building level corresponding to the virtual building of the first camp (which may be referred to as a first building level), a building level corresponding to the virtual building of the second camp (which may be referred to as a second building level), and a first path may be displayed on the combat interface. The first building level is used for generating a first virtual attacking unit, the first virtual attacking unit is used for moving to the virtual building of the second camp along the first path, and the first virtual attacking unit is further used for attacking the virtual building of the second camp, for example, when the virtual building of the second camp enters an attack range of the first virtual attacking unit.

Further, when the first building level is upgraded, the terminal device may respond to this level upgrade, and display, in the game interface, a second virtual attacking unit generated based on a first updated building level (a building level after the first building level is upgraded). The second virtual attacking unit is used for moving to the virtual building of the second camp along the first path, and the second virtual attacking unit is further used for attacking the virtual building of the second camp, for example, when the virtual building of the second camp enters an attack range of the second camp virtual attacking unit. In addition, the virtual health value of the second virtual attacking unit is higher than a virtual health value of the first virtual attacking unit.

It is to be understood that a virtual attacking unit (for example, the first virtual attacking unit or the second virtual attacking unit) that attacks the virtual building of the second camp may be generated based on the building level of the virtual building of the first camp, and when the building level of the virtual building of the first camp is higher, a virtual health value of a virtual attacking unit generated thereby that attacks the virtual building of the second camp is also higher. A virtual attacking unit that attacks the virtual building of the first camp (which may be referred to as a third virtual attacking unit or a fourth virtual attacking unit for ease of differentiation) may also be generated based on the second building level of the virtual building of the second camp, and when the building level of the virtual building of the second camp is higher, a virtual health value of a virtual attacking unit generated thereby that attacks the virtual building of the first camp is also higher.

It may be understood that, a virtual health value of a virtual attacking unit that attacks a camp virtual building of a camp in which a player is located may be used for representing current game difficulty level of the player. For example, a higher virtual health value of a virtual attacking unit makes it more difficult to attack the virtual attacking unit to enable it to be in a health depleted state. The virtual attacking unit has more time to attack the camp virtual building of the player, that is, the current game difficulty level of the player is higher. That is, the virtual health value of the virtual attacking unit may be used for representing the game difficulty level in combat. In this application, when the combat is displayed, building levels of camp virtual buildings of both parties are displayed together, and the building level is associated with the game difficulty level of the opponent. That is, the current building level of the camp virtual building of the opponent may be a quantization level of the current game difficulty level of the player, and may be used for representing the current game difficulty level of the player. After a user enters combat, current game difficulty level of the user may be determined by using a building level of a camp virtual building of the opponent. Once the building level of the opponent is upgraded, the game difficulty level of the player can be represented as upgraded. Displaying the building level of the camp virtual building enriches presentation information of the combat and provides more combat information. In addition, by using the building level presented in the combat, the user may also determine current game difficulty level of the user and game difficulty level of the opponent, so that a corresponding game strategy can be formulated more conveniently and accurately, and a game threshold can be reduced.

It may be understood that the method provided in this embodiment of the present application may be performed by a computer device, and the computer device includes but is not limited to a terminal device or a service server. The service server may be an independent physical server, or may be a server cluster or a distributed system formed by multiple physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

The terminal device and the service server may be directly or indirectly connected in a wired or wireless communication manner, which is not limited in this application.

In one embodiment, data related to the user (for example, a bound account of the user, data uploaded by the user, and related game data of the user in the combat) such as user information and user data is obtained and processed only after a permission granted by the user is obtained. That is, when the embodiment of this application is applied to a specific product or technology, a user's permission or consent needs to be obtained, and related data collection, use, and processing need to comply with relevant laws and standards of a relevant country and region.

In some embodiments, it may be understood that the computer device (for example, the service server 1000, the terminal device 100a, and the terminal 100b) may be a node in a distributed system, the distributed system may be a blockchain system, and the blockchain system may be a distributed system formed by connecting the plurality of nodes in a form of network communication. A peer-to-peer (P2P) network may be formed between nodes, and a P2P protocol is an application layer protocol that runs on a Transmission Control Protocol (TCP). In the distributed system, any form of computer device, such as an electronic device such as a service server or a terminal device, may become a node in the blockchain system by joining the peer-to-peer network. For ease of understanding, the following describes the concept of the blockchain: A blockchain is a new application mode of a computer technology such as distributed data storage, point-to-point transmission, a consensus mechanism, or an encryption algorithm. It is mainly used for sorting data in chronological order and encrypting the data into a ledger, so that the data cannot be tampered with or forged, and the data can be verified, stored, and updated. When a computer device is a blockchain node, because of a non-tampering feature and an anti-counterfeiting feature of the blockchain, data in this application (such as a building level of a camp virtual building and related game data in a combat) can be authentic and secure, so that a result obtained after related data processing is performed based on the data can be more reliable.

Figure 2:
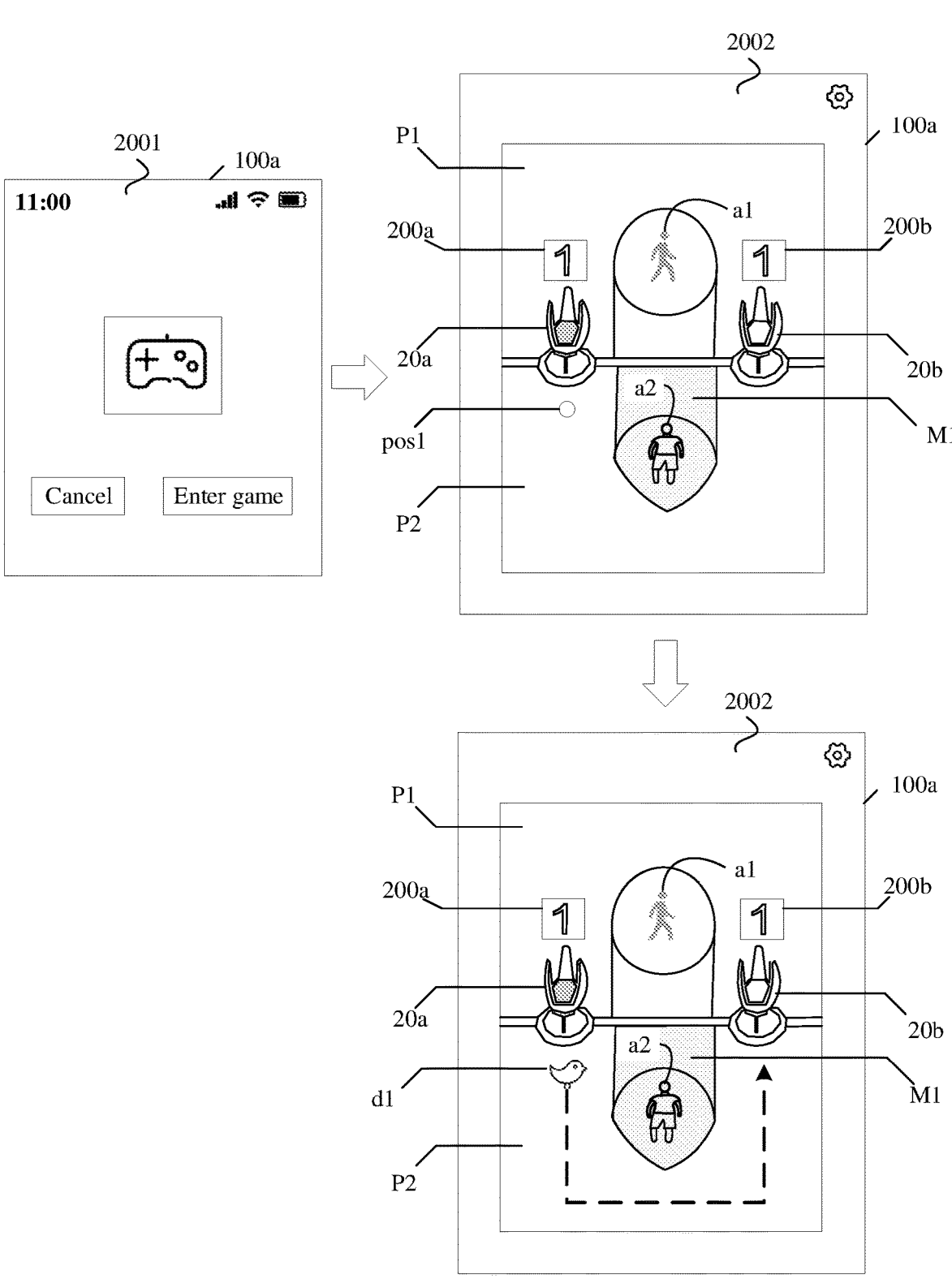
FIG. 2 is a schematic diagram of displaying a combat according to an embodiment of this application.

FIG. 2 is a schematic diagram of a combat scenario according to an embodiment of this application. A terminal device 100a shown in FIG. 2 may be the terminal device 100a in the terminal device cluster in the foregoing embodiment corresponding to FIG. 1.

As shown in FIG. 2, terminal device 100a may be a terminal device corresponding to user a2. The user a2 may log in to a PVP tower defense game application by using a bound account of the user a2 in a game application. A user a1 may also log in to the game application by using a bound account of the user a1 in the PVP tower defense game application. When both user a1 and the user a2 log in to the PVP tower defense game application, the user a1 and the user a2 may enter the same combat. As shown in FIG. 2, after the user a2 starts the game application, the terminal device 100a may respond to this start operation, and display a game login interface 2001. The game login interface 2001 may include an enter game control and a cancel control. The user a2 may enter the game by using the enter game control, or may exit the game by using the cancel control.

As shown in FIG. 2, after the user a2 performs a trigger operation on the enter game control, the terminal device 100a may respond to the trigger operation, display a combat interface (also referred to as a game interface) 2002, and display combat details in the combat interface 2002. Herein, that the user a1 and the user a2 are opponent players in the same combat is used as an example. The terminal device 100a may display a region P1 and a region P2 in the combat interface 2002, where the region P1 is a region in which the user a1 is located (a region associated with the user a1), the region P2 is a region in which the user a2 is located (a region associated with the user a2), and the region P1 may include an object display sub-region used for displaying the user a1 (which may be understood as displaying a virtual role or a virtual object of the user a1 in the combat). The object display sub-region may display a contention object a1 (which may also be referred to as a combat object 1, which may be understood as a virtual object or a virtual role of the user a1 in the combat). Region P2 may include an object display sub-region used for displaying the user a2, and a target object a2 (which may be understood as a virtual object or a virtual role of the user a2 in the combat) may be displayed in the object display sub-region. The user a2 is used as an example. As shown in FIG. 2, region P2 may include an object display sub-region M1, and the user a2 may be displayed in the object display sub-region M1 (a virtual role or a virtual object is displayed). In addition, terminal device 100a may display, in the combat, camp virtual buildings (which may be understood as game bases in the combat) of camps in which the contention object a1 and the target object a2 are respectively located. As shown in FIG. 2, the terminal device 100a may display, in the combat, a camp virtual building 20a (that is, a camp virtual building of a camp in which the contention object a1 is located, which may be referred to as a virtual building of a second camp) and a camp virtual building 20b (that is, a camp virtual building of a camp in which the target object a2 is located, which may be referred to as a virtual building of a first camp).

In addition, it may be understood that the PVP tower defense game may include a virtual attacking unit (for example, a virtual wild monster). The virtual attacking unit attacks a camp virtual building, and a player needs to attack these virtual attacking units to defend against an attack on a camp virtual building of the player (where the player may attack the virtual attacking unit by controlling a virtual role in the combat). However, in one embodiment, a virtual health value of a virtual attacking unit (which may be understood as a virtual life value; when the virtual health value is an invalid value, a virtual life status of the virtual attacking unit is a lifeless state, and does not have a permission to attack a camp virtual building; the invalid value may be 0 or another preset value) is associated with a building level of a camp virtual building. In one embodiment, when a camp virtual building is displayed, a building level corresponding to the camp virtual building may be displayed at the same time. A building level corresponding to a current camp virtual building of a player may be used for representing current game difficulty level of an opponent. For example, a higher building level corresponding to the current camp virtual building of the player indicates a higher virtual health value of a virtual attacking unit that attacks a virtual camp virtual building of the opponent, so that it is more difficult for a virtual attacking unit of the opponent to make it in a lifeless state, and difficulty in guarding the camp virtual building is higher, that is, game difficulty level of the opponent is higher.

That is, in one embodiment, a virtual attacking unit that attacks a player may be generated based on a building level of an opponent. For example, as shown in FIG. 2, a virtual attacking unit that attacks the virtual building of the first camp 20b may be generated based on a second building level of the virtual building of the second camp 20a. It may be understood that a region except the object display sub-region M1 in the region P2 shown in FIG. 2 may be referred to as a path display sub-region. A second path may be displayed in the path display sub-region. After being generated, a virtual attacking unit used for attacking the virtual building of the first camp 20b may move to the virtual building of the first camp 20b along the second path. For example, a unit generation position of a virtual attacking unit is a position point pos1 in a path display sub-region. The terminal device 100a may determine, based on a current building level 1 of the virtual building of the second camp 20a, a virtual health value of a virtual attacking unit used for attacking the virtual building of the first camp 20b, and after determining the virtual health value, may generate the virtual attacking unit d1 at the unit generation position pos1. Herein, that all regions of the path display sub-region are second paths is used as an example. A virtual attacking unit d1 may move from the unit generation position pos1 to the virtual building of the first camp 20b along the second path in a moving direction indicated by a dashed-line arrow shown in FIG. 2. When the virtual building of the first camp 20b enters an attack range of the virtual attacking unit d1, the virtual attacking unit d1 may attack the virtual building of the first camp 20b.

In a process in which the virtual attacking unit d1 moves to the virtual building of the first camp 20b along the second path, a target object a2 may also attack the virtual attacking unit d1 (in fact, the user a2 controls the virtual role in the combat, that is, the target object a2 to operate), so that the virtual attacking unit d1 is in a health depleted state as soon as possible. Therefore, the virtual attacking unit d1 may be in a health depleted state when the virtual building of the first camp 20b does not enter the attack range of the virtual attacking unit d1, so that attack to the virtual building of the first camp 20b can be resisted. The attack range of the virtual attacking unit d1 may be an arc-shaped region that is in the object display region P2 and that uses the virtual attacking unit d1 as a center and a preset distance (for example, 0.5 m) as a radius. The attack range of the virtual attacking unit d1 may alternatively be a rectangular region that includes the virtual attacking unit d1 in the object display region P2. The attack range of the virtual attacking unit d1 is not limited herein.

When entering combat, a building level of a camp virtual building corresponding to each of two combat parties (that is, a contention object a1 and a target object a2) may be the same level (for example, both are 1). As shown in FIG. 2, at the start moment of the combat, the terminal device 100*a* may display the camp virtual building 20*a*, and display a building level corresponding to the camp virtual building 20*a* as a level 1 (that is, a default initial level, displayed in a component display region 200*a*). In addition, terminal device 100*a* may display the camp virtual building 20*b*, and display a building level corresponding to the camp virtual building 20*b* as the level 1 (that is, a default initial level, displayed in a component display region 200*b*). The virtual health values of virtual attacking units of both attack parties may be the same at the same building level. It may be understood that when a building level of a camp virtual building of a camp is upgraded, the terminal device may respond to this level upgrade, and determine, based on the upgraded building level, a new virtual health value (the new virtual health value is greater) of the virtual attacking unit that attacks the opponent. That is, a new virtual attacking unit that has a larger virtual health value may be generated based on the upgraded building level. For example, if the building level of the virtual building of the second camp 20*a* shown in FIG. 2 is upgraded (which may be referred to as a second updated building level), the terminal device may generate, based on the second updated building level, a new virtual attacking unit that attacks the virtual building of the first camp 20*b*. After generation, the new virtual attacking unit may move to the virtual building of the first camp 20*b* along the first path. When the virtual building of the first camp 20*b* enters an attack range of the virtual attacking unit, the virtual attacking unit may attack the virtual building of the first camp 20*b*. It is to be understood that when the building level of the virtual building of the second camp 20*a* is upgraded, but the building level of the virtual building of the first camp 20*b* is not upgraded, the virtual health value of the virtual attacking unit that attacks the virtual building of the first camp 20*b* becomes higher, and the user a2 becomes more difficult to guard the camp virtual building, and the user a1 is more likely to win the combat. That is, a user with a higher building level may create more game problems for the game of the opponent (for example, making the game of the opponent more difficult), that is, a user with a higher building level is more beneficial to the game of the user.

In some embodiments, a trigger operation for each control may include a contact operation such as tap or long press, or may include a non-contact operation such as voice or gesture, which is not limited herein.

It is to be understood that, in some embodiments, a camp virtual building and a building level corresponding to the camp virtual building may be displayed in combat, and presentation forms of the combat may be enriched. In addition, the building level is a level obtained by quantifying game difficulty level, and may be used for representing game difficulty level, and may provide higher convenience for a user to formulate a game strategy, thereby reducing a game threshold.

Further, referring to FIG. 3, FIG. 3 is a schematic flowchart of a game data processing method according to an embodiment of this application. The method may be performed by a terminal device (for example, any terminal device in the foregoing terminal device cluster 100 shown in FIG. 1) or a service server (for example, the foregoing service server 1000 shown in FIG. 1), or may be performed jointly by the terminal device and the service server. For ease of understanding, this embodiment is described by using an example in which the method is performed by the foregoing terminal device. The game data processing method may include at least the following S101-S102:

S101. Display a game interface; the game interface including a virtual building of a first camp, a first building level corresponding to the virtual building of the first camp, a virtual building of a second camp, a second building level corresponding to the virtual building of the second camp, and a first path; and the first building level being used for generating a first virtual attacking unit, the first virtual attacking unit being used for moving to the virtual building of the second camp along the first path, and the first virtual attacking unit being further used for attacking the virtual building of the second camp.

In some embodiments, when a user runs a game application (for example, a PVP tower defense game application) in the terminal device, a bound account in the game application may be used for logging in to the game application, and the bound account thereof may also be referred to as a service object. For a target user, a bound account corresponding to the target user may be referred to as a target object (actually, game behavior data generated by the bound account is game behavior data generated by the user by using the bound account, and the target object may be actually understood as the target user). It may be understood that when the user runs the game application and enters the combat, the terminal device may display a combat interface (or referred to as a game interface) in the game application, and display combat details in the combat interface.

It may be understood that, for example, in a player combat game, there may be camp virtual buildings of camps in which two players (herein, one player may be referred to as a target object and the other player is referred to as a contention object) are respectively located. In a game scenario, the camp virtual building may be understood as a game base, and may be presented in the form of a virtual building (for example, a virtual house, a virtual crystal ball, a virtual tower) in combat. The combat includes a virtual attacking unit (such as a virtual wild monster) that attacks a camp virtual building. If the virtual attacking unit attacks the camp virtual building, a building attribute parameter of the camp virtual building (which may be understood as a virtual life amount, and may be represented in a presentation form of a progress bar in the combat; when the building attribute parameter of the camp virtual building is an initial value, the progress bar may be displayed as a full progress bar, and when the camp virtual building is attacked, the progress bar may be reduced for display: that is, the progress is no longer full progress) is correspondingly reduced. The player mainly performs the combat by defending the camp virtual building. Once the building attribute parameter of the camp virtual building of the camp in which the player is located is an invalid value (the virtual life amount is 0, and the progress bar is empty progress), the camp virtual building is in an invalid state (which may be understood that a virtual life status is a lifeless state), the player has a game failure result in the combat, and the opponent has a game winning result. That is, the camp virtual building is mainly used for representing a winning or losing state of the game camp, and when a camp virtual building corresponding to a player is first in the invalid state, the player is in a combat failure state.

In one embodiment, if the game is a game for guarding a camp virtual building or another game including a camp virtual building, after the user enters the combat, the terminal device may display, on the combat interface, a camp virtual building used for representing each game camp. For example, the terminal device may display, in the combat, a camp virtual building of a camp in which a target object is located (which may be referred to as a first game camp), and may also display, in the combat, a camp virtual building of a camp in which a contention object is located (which may be referred to as a second game camp) (for ease of differentiation, the camp virtual building of the second game camp may be referred to herein as a virtual building of a second camp).

In addition, to enable a user to intuitively perceive game difficulty level, improve convenience of a player for a game-specific game strategy, and reduce a threshold, in this application, a camp virtual building may be displayed in a combat, while a building level associated with each camp virtual building is displayed in the combat. Using a first combat camp and a second combat camp as an example, a camp virtual building of the first combat camp may be displayed in the combat, and a building level associated with the camp virtual building (a first building level) is displayed in the combat. A camp virtual building of the second game camp may also be displayed in the combat, and a building level (second building level) associated with the camp virtual building is displayed.

It may be understood that, in this application, a building level may be associated with game difficulty level. For example, a building level may be associated with a virtual health value of a virtual attacking unit of an attack camp virtual building, and a virtual health value of a virtual attacking unit that attacks a camp virtual building of an opponent is determined based on a building level of a player. That is, based on the first building level, a first virtual attacking unit (a virtual health value is determined by the first building level) may be generated. The first virtual attacking unit may move to the virtual building of the second camp along the first path in the combat. In a moving process, a contention object may attack the first virtual attacking unit, so that the virtual health value of the first virtual attacking unit is decreasing, until the first virtual attacking unit is in a health depleted state or being eliminated. If the first virtual attacking unit is in a health depleted state in the moving process, the first virtual attacking unit does not attack the virtual building of the second camp. In a moving process of the first virtual attacking unit, when the virtual building of the second camp enters an attack range of the first virtual attacking unit, the first virtual attacking unit may attack the virtual building of the second camp.

S102. Display, in the game interface, a second virtual attacking unit generated based on a first updated building level in response to the first building level upgrading to the first updated building level; the second virtual attacking unit being used for moving to the virtual building of the second camp along the first path, the second virtual attacking unit being further used for attacking the virtual building of the second camp, and a virtual health value of the second virtual attacking unit being higher than a virtual health value of the first virtual attacking unit.

In some embodiments, a user (such as a target object) may obtain a virtual resource (such as a game experience value, a game score, or a game gold coin) by using a resource obtaining operation (such as an attack wild monster operation, a release auxiliary skill operation, or a game prop use operation) in the combat, and the obtained virtual resource may be used for upgrading a building level of a camp virtual building of a player. After the obtained virtual resource meets a requirement of building level upgrading, a current building level may be upgraded. However, in this application, a building level may be associated with game difficulty level, and when a building level of a player is upgraded, game difficulty level of the opponent may also be increased based on the building level of the player. For example, when the first building level of the virtual building of the first camp is upgraded, the virtual life value of the virtual attacking unit that attacks the virtual building of the second camp is increased. In this case, the terminal device may display, in the game interface, a virtual attacking unit (which may be referred to as a second virtual attacking unit) generated based on the first updated building level in response to level upgrading of the first building level. The virtual life value of the second virtual attacking unit is higher. The second virtual attacking unit may also move to the virtual building of the second camp along the first path to attack the virtual building of the second camp. In the process of the second virtual attacking unit moving to the virtual building of the second camp, a contention object may also attack the virtual building of the second camp. However, because the virtual life value of the second virtual attacking unit is higher, it is more difficult for the contention object to make the virtual building of the second camp into a health depleted state, and the contention object has a higher probability of making the virtual building of the second camp to enter an attack range of the second virtual attacking unit, so that the second virtual attacking unit attacks the virtual building of the second camp.

It may be understood that the combat may also include a second path, and the second path is used for moving a virtual attacking unit that attacks the virtual building of the first camp, to attack the virtual building of the first camp. That is, the game interface may further include the second path, the second building level is used for generating a third virtual attacking unit, and the third virtual attacking unit may move to first camp virtual building along the second path. When the virtual building of the first camp is within an attack range of the third virtual attacking unit, the third virtual attacking unit may attack the virtual building of the first camp. In one example, the third virtual attaching unit may be depleted, the second building level of the virtual building of the second camp may then upgraded. The virtual life value of the virtual attacking unit that attacks the virtual building of the first camp may be increased. In this case, the terminal device may display, in the game interface, a fourth virtual attacking unit generated based on a second updated building level in response to level upgrading of the second building level. The second updated building level refers to a building level after the second building level is upgraded. The fourth virtual attacking unit is used for moving to the virtual building of the first camp along the second path, the fourth virtual attacking unit is further used for attacking the virtual building of the first camp, and a virtual health value of the fourth virtual attacking unit is higher than a virtual health value of the third virtual attacking unit. It is to be understood that, in a process of the fourth virtual attacking unit moving to the virtual building of the first camp, the target object may also attack the virtual building of the first camp. However, because a virtual life value of the fourth virtual attacking unit is higher, it is more difficult for the target object to make the virtual building of the first camp in a health depleted state, and the target object has a higher probability of making the virtual building of the first camp to enter an attack range of the fourth virtual attacking unit, so that the fourth virtual attacking unit attacks the virtual building of the first camp.

It may be understood that when the user starts a game and enters a combat, the terminal device may display a first object display region and a second object display region in a combat interface (which may also be referred to as a game interface), where the first object display region may be used for displaying a target object (that is, the first object display region is associated with the target object), and the second object display region may be used for displaying a contention object (that is, the second object display region is associated with the contention object). That is, the first object display region may be a region in which the target object is located, and the second object display region may be a region in which the contention object is located. Both the virtual building of the first camp and the virtual building of the second camp may be in an intermediate region (the intermediate region refers to a common display region between the first object display region and the second object display region). The first path may be in the second object display region, and the first path may be a path from a first attacking unit generation position in the second object display region to the virtual building of the second camp. The first attacking unit generation position refers to a generation position of the first virtual attacking unit or the second virtual attacking unit. The second path may be in the first object display region, and the second path may be a path from a second attacking unit generation position in the first object display region to the virtual building of the first camp. The second attacking unit generation position refers to a generation position of the third virtual attacking unit or fourth virtual attacking unit. For ease of understanding, refer to the combat interface 2002 in the foregoing embodiment corresponding to FIG. 2. In the combat interface 2002, the first object display region may be a region P2, and may be used for displaying the target object a2 (a virtual role of the target object a2 in the combat is displayed in the object display sub-region M1). The second object display region may be a region P1, and may be used for displaying the contention object a1 (a virtual role of the contention object a1 in the combat is displayed in the object display sub-region in the region P1). The virtual building of the first camp 20*b* may be a virtual building of a first camp, the virtual building of the second camp 20*a* may be a virtual building of a second camp, the virtual building of the first camp 20*b* and the virtual building of the second camp 20*a* are located in the intermediate region (that is, a common display region) between the object display region P1 and the object display region P2, and the second path may refer to a path from an attacking unit generation position pos1 to the virtual building of the first camp 20*b*. The first path may be a path from the attacking unit generation position in the object display region P1 to the virtual building of the second camp 20*a*.

In one embodiment, when a game is started on a target object, a game interface for a combat may be displayed in a game application, and a virtual building of a first camp, a first building level corresponding to the virtual building of the first camp, a virtual building of a second camp, a second building level corresponding to the virtual building of the second camp, and a first path are displayed in a combat interface. The first building level is used for generating a first virtual attacking unit, the first virtual attacking unit is used for moving to the virtual building of the second camp along the first path, and the first virtual attacking unit is further used for attacking the virtual building of the second camp. When the first building level is upgraded to the first updated building level, a second virtual attacking unit generated based on the first updated building level may be displayed in the game interface, the second virtual attacking unit is used for moving to the virtual building of the second camp along the first path, the second virtual attacking unit is further used for attacking the virtual building of the second camp, and a virtual health value of the second virtual attacking unit is higher than a virtual health value of the first virtual attacking unit. It may be understood that, in a case in which a virtual health value of a virtual attacking unit is higher, it becomes more difficult to attack the virtual attacking unit so that the virtual attacking unit is in a health depleted state, and the virtual attacking unit has more time to attack the virtual building of the second camp, thereby making the game more difficult. That is, in this application, a building level of a camp virtual building may be associated with game difficulty level (a virtual health value of a virtual attacking unit may be used for representing game difficulty level). The first building level of the virtual building of the first camp is used for quantifying a virtual health value of the first or the second virtual attacking unit that attacks the virtual building of the second camp. Therefore, current game difficulty level (for example, a higher first building level indicates a higher virtual life value of a virtual attacking unit that attacks the virtual building of the second camp, and higher game difficulty level of a camp corresponding to the virtual building of the second camp) may be visually presented in a game interface, and a service object (which may be understood as a player) corresponding to the virtual building of the second camp may be assisted in formulating a more accurate game strategy. In conclusion, in this application, game difficulty level in a combat may be quantified and presented in a combat interface, thereby enriching presentation forms of the combat, and improving convenience of making a game strategy by a service object.

In this application, to enable a user to intuitively perceive game difficulty level, improve convenience of a player for a game-specified game strategy, and reduce a game threshold, a camp virtual building may be displayed in a combat, a building level associated with each camp virtual building may be displayed in the combat, and an upgrade progress component corresponding to the building level may be further displayed. Using the first game camp as an example, a camp virtual building of the first game camp may be displayed in the combat, and a building level (a first building level) associated with the camp virtual building and an upgrade progress component corresponding to the first building level are displayed. A user (such as a target object) may obtain a virtual resource (such as a game experience value, a game score, or a game gold coin) by using a resource obtaining operation (such as an attack wild monster operation, a release auxiliary skill operation, or a game prop use operation) in the combat. The virtual resource may also be referred to as an experience point. The obtained virtual resource may be used for upgrading a building level of a camp virtual building of a player, and an upgrade progress component may be used for representing progress of upgrading from a current building level (such as a first building level) to a higher building level (such as a first updated building level). As a target object obtains more virtual resources, the progress increases. The progress upgrade component herein may be a pattern, an animation, or the like. For example, the progress upgrade component may be presented in the combat in a water level pattern, where the water level pattern may be presented in the combat interface in a form such as a floating window, a mask layer form, and a translucent form where a display size of the water level pattern may be changed by using a drag operation. The upgrade progress component and the building level of the camp virtual building may be displayed in the same region, and therefore, the building level and the current upgrade progress corresponding to the building level may be intuitively presented.

Figure 4:
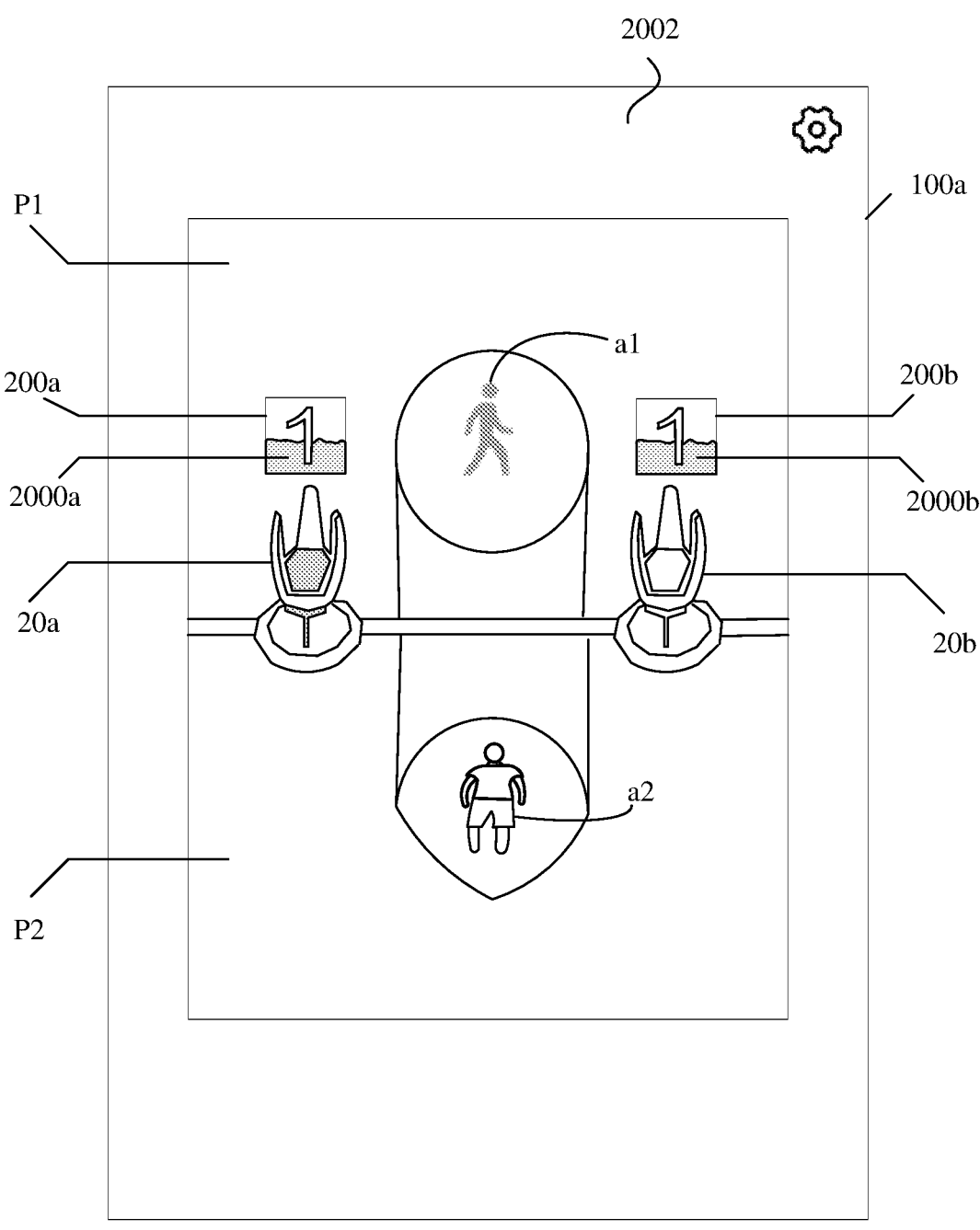
FIG. 4 is a schematic diagram of updating and displaying an upgrade progress component according to an embodiment of this application.

For example, as shown in FIG. 4, FIG. 4 is a schematic diagram of a scenario of displaying an upgrade progress component according to an embodiment of this application. In the scenario embodiment shown in FIG. 4, for a virtual building of a second camp 20*a* and a virtual building of a first camp 20*b*, an upgrade progress component 2000*a* may be an upgrade progress component of the virtual building of the second camp 20*a*, and an upgrade progress component 2000*b* may be an upgrade progress component of the virtual building of the first camp 20*b*. The upgrade progress component 2000*a* and the upgrade progress component 2000*b* may be presented in a water level pattern. The upgrade progress component 2000*a* and a building level 1 are presented in a component display region 200*a* together. The upgrade progress component 2000*b* and a building level 1 of the virtual building of the first camp 20*b* are presented in a component display region 200*b* together, which may clearly present that a current building level of the camp virtual building 20*a* is the level 1, and upgrade progress corresponding to the current building level 1 is which progress.

At a start moment of a combat, building levels of camp virtual buildings of two combat parties may be the same (may be a default initial level, for example, the level 1), and at the start moment of the combat, upgrade progress corresponding to the building levels of the two combat parties are the same (for example, the water levels are at the same height).

It may be understood that, after a building level of a camp virtual building and upgrade progress thereof are displayed on the combat interface, a user may obtain a corresponding virtual resource in the combat based on the building level and the upgrade progress. After the obtained virtual resource meets a requirement virtual resource required for building level upgrading, the current building level may be upgraded. In this application, the building level may be associated with game difficulty level, and when a building level of a player is upgraded, game difficulty level of the opponent is also increased based on the building level of the player. For ease of understanding, referring to FIG. 5 together, FIG. 5 is a schematic flowchart of updating and displaying a building level according to an embodiment of this application. The target object is used as an example in the procedure shown in FIG. 5. If the target object generates a resource obtaining operation on the combat interface, the terminal device may perform the procedure shown in FIG. 5. As shown in FIG. 5, the procedure may include at least the following S301-S302:

S301. Update and display, in response to a resource obtaining operation for the virtual building of the first camp in the game interface, the upgrade progress component based on a virtual resource obtained by the resource obtaining operation.

Specifically, if the target object generates a resource obtaining operation in the combat interface, the terminal device may display, in response to the resource obtaining operation for the virtual building of the first camp in the game interface, a progress increment animation for the virtual resource in a component display region to which the upgrade progress component belongs; and display, in the component display region, the upgrade progress component after progress increment update in a case that playback of the progress increment animation ends.

S302. Update and display the first building level as the first updated building level in a case that the updated and displayed upgrade progress component meets a level update condition corresponding to the first building level, and execute the operation of displaying, in the game interface (that is, a combat scenario), a second virtual attacking unit generated based on a first updated building level in response to upgrading of the first building level.

Specifically, when the updated and displayed upgrade progress component meets a level update condition corresponding to the first building level, the first building level may be updated to be displayed as a first updated building level, and game difficulty level of the second game camp in the combat is updated to matching difficulty of the first updated building level (that is, the step of displaying, in the game interface, a second virtual attacking unit generated based on a first updated building level in response to upgrading of the first building level is performed).

Figure 6:
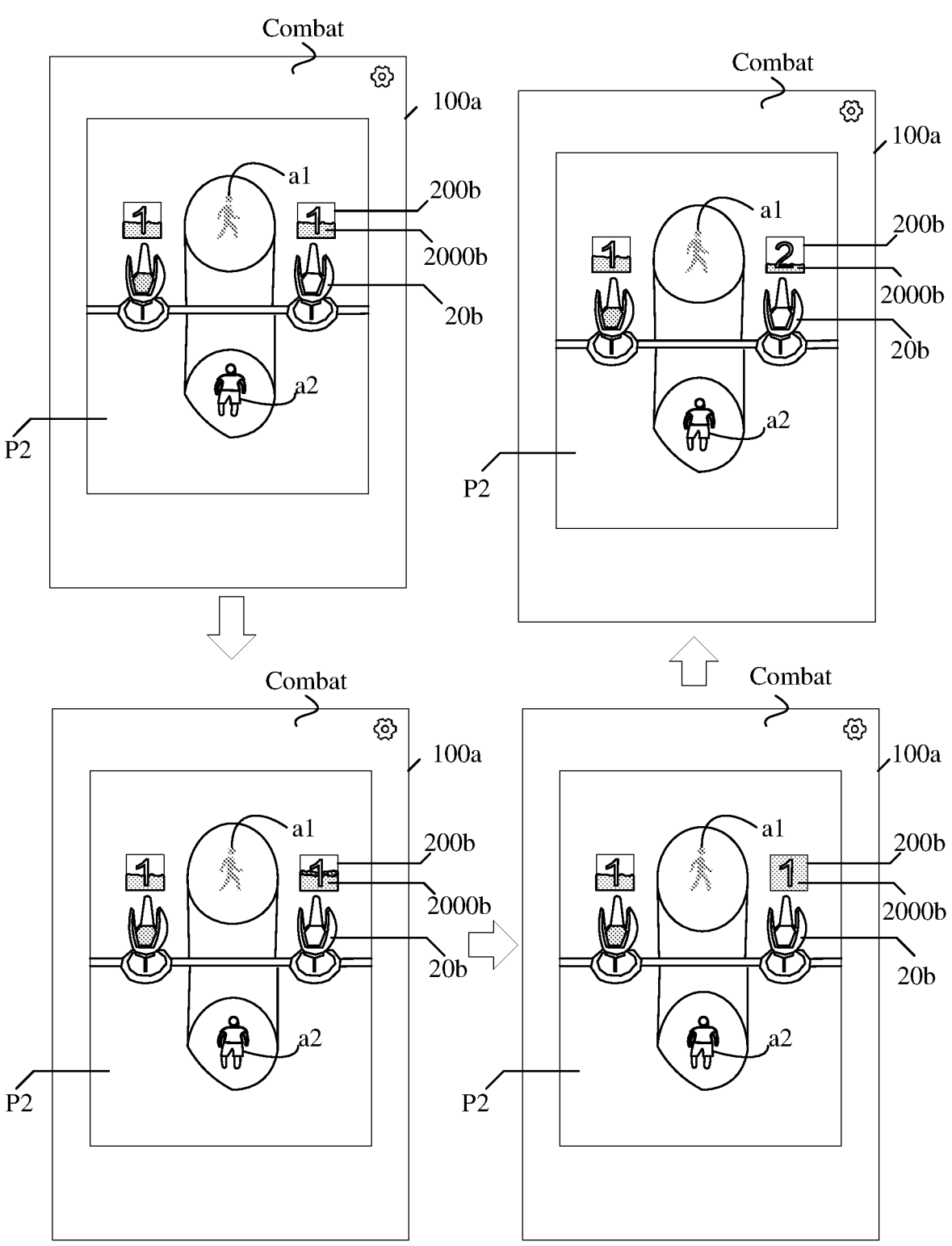
FIG. 6 is a schematic diagram of updating and displaying an upgrade progress component according to an embodiment of this application.

For ease of understanding, referring to FIG. 6, FIG. 6 is a schematic diagram of a scenario of updating and displaying an upgrade progress component according to an embodiment of this application. As shown in FIG. 6, the foregoing scenario embodiment corresponding to FIG. 2 is used as an example. For example, the current building level (that is, the level 1, which may be understood as the first building level) corresponding to the camp virtual building 20*b*, and the upgrade progress component 2000*b* that is upgraded from the current building level to a higher building level (such as a level 2) are displayed in the component display region 200*b*, where the upgrade progress component 2000*b* is a water level pattern. It may be understood that, for the upgrade progress component 2000*b* represented by using the water level pattern shown in FIG. 6, progress may be represented by using a water level height (progress height) corresponding to the upgrade progress component 2000*b*. When the water level height is a default initial value (such as 0), the progress is 0, and when the user a2 obtains a specific virtual resource, the water level height increases in an equal proportion (that is, the upgrade progress component 2000*b* is also updated and displayed; for example, if the user a2 obtains 100 game experience values, the water level height may be increased by 1 mm accordingly). When the height of the water level reaches a height threshold, that is, the updated and displayed upgrade progress component meets a level update condition corresponding to the current building level, in this case, the building level of the virtual building of the first camp 20*b* may be upgraded.

For example, as shown in FIG. 6, the virtual resource is a game experience value or a game experience point. When the user a2 obtains 180 game experience values by using a resource obtaining operation, the terminal device 100*a* may display a progress increment animation in the combat. The upgrade progress component 2000*b* shown in FIG. 6 uses a water level pattern as an example. In this case, a progress increment animation may be used as an example to gradually and incrementally display a current water level height, and the water level height may be raised to a height after 180 game experience values are increased in the combat (that is, the water level height is increased by an increment height indicated by 180 game experience values, for example, 3 millimeters). In a playback process of the progress increment animation, when the water level height is increased by 2 millimeters (that is, an increment height corresponding to 120 game experience values), the water level height reaches a height threshold (for example, the height threshold is a region boundary of the component display region 200*b*), that is, a condition of upgrading the building level from the level 1 to the level 2 (the level 2 may be understood as a first updated building level) is already met. In this case, the building level of the camp virtual building 20*b* may be increased from the level 1 to the level 2, and an increment height (1 millimeter) indicated by the remaining 60 game experience values is used as a progress height for upgrading from the building level 2 to a higher building level (such as a level 3), that is, the increment height (1 millimeter) indicated by the remaining 60 game experience values may be an upgrade progress component corresponding to the building level 2.

In one embodiment, in a manner of displaying a building level of a camp virtual building and upgrade progress on a combat interface, game difficulty level is quantified as a building level, which may enrich presentation forms of the combat interface and present more game information. The current game difficulty level and upgrade progress can be intuitively presented in the combat interface. This can assist a player in formulating a game strategy more conveniently and accurately, and improve combat effects.

It may be understood that a game may include a camp virtual building, and may include a virtual attacking unit. The virtual attacking unit may be understood as a virtual unit (for example, a virtual wild monster in a game) that generates an attack behavior on the camp virtual building. The virtual attacking unit may reduce, by using an attack behavior, a building attribute parameter (a virtual life amount) of the camp virtual building, that is, reduce a virtual life amount of the camp virtual building until the building attribute parameter of the camp virtual building is an invalid value), and a player (for example, a target object) may make an attacking unit attribute parameter (which may be understood as a virtual life amount, and may be presented by using a life amount progress bar in a combat; when the virtual attacking unit is not attacked, an attribute parameter thereof may be an initial value; in this case, the life amount progress bar may be displayed as a full progress bar; when the virtual attacking unit is attacked, the life amount progress bar may be reduced for display; that is, the progress is no longer full progress) be an invalid value, to resist attack from the virtual attacking unit to the camp virtual building. In this application, the target object may also obtain a corresponding virtual resource (for example, a game experience value) for an attack behavior of the virtual attacking unit. For example, the target object attacks the virtual attacking unit and changes the attacking unit attribute parameter thereof to an invalid parameter, and the target object may obtain a corresponding virtual resource. Correspondingly, an upgrade progress component of the camp virtual building is also updated accordingly. For ease of understanding, referring to FIG. 7, FIG. 7 is a schematic diagram of a process of updating and displaying an upgrade progress component according to an embodiment of this application. In the procedure, the game interface in the embodiment corresponding to FIG. 5 further includes a second path. The second building level is used for generating a third virtual attacking unit, the third virtual attacking unit is used for moving to the virtual building of the first camp along the second path, and the third virtual attacking unit is further used for attacking the virtual building of the first camp when in a building attack range of the virtual building of the first camp. The resource obtaining operation for the game interface is a process of using an attack operation for the third virtual attacking unit as an example. As shown in FIG. 7, the procedure may include at least the following S501-S502:

S501. Display an attacking unit attribute parameter of the third virtual attacking unit in the game interface.

Specifically, when the terminal device displays the third virtual attacking unit in the game interface, the attacking unit attribute parameter of the third virtual attacking unit may be displayed together.

The attacking unit attribute parameter may be used for representing a virtual life status of a virtual attacking unit in combat. The attacking unit attribute parameter may be presented in combat in a presentation form of a life amount progress bar. For example, a virtual blood amount represents a virtual life amount. When a virtual attacking unit is generated and has not been attacked, an initial attacking unit attribute parameter of the virtual attacking unit may be a blood amount progress bar with full progress, and when the virtual attacking unit is attacked, progress of the blood amount progress bar decreases accordingly.

S502. Perform, in response to an attack operation for the third virtual attacking unit, decrement display on the attacking unit attribute parameter of the third virtual attacking unit.

Specifically, the attacking unit attribute parameter of the third virtual attacking unit may be used for representing a virtual life value of the virtual attacking unit. The attacking unit attribute parameter may be presented in a presentation form such as a progress bar pattern, and may be used for reminding a target object of a virtual vital sign state of a current virtual attacking unit. The virtual vital sign state may include a sign valid state (when the virtual attacking unit is in a sign valid state, the virtual attacking unit may attack the camp virtual building, causing injury to the camp virtual building, and affecting a building attribute parameter of the camp virtual building) and a health depleted state (when the virtual attacking unit is in a health depleted state, the attacking unit does not have a permission to attack the camp virtual building, and does not affect an attribute parameter of the camp virtual building; when the third virtual attacking unit is in a health depleted state, the terminal device may hide the third virtual attacking unit). The health depleted state herein may mean that the attacking unit attribute parameter of the virtual attacking unit meets a preset health depleted condition. The health depleted condition herein may be a manually preset condition. For example, if the attacking unit attribute parameter is a progress bar pattern presentation form with full progress and the health depleted condition is that a progress bar with full progress becomes 0 progress, when the progress bar of the third virtual attacking unit decreases from full progress to 0 progress, the third virtual attacking unit is in a health depleted state.

It may be understood that the terminal device may provide an attack control for the virtual attacking unit in the combat, and the target object may generate an attack behavior for the virtual attacking unit by using a trigger operation on the attack control. Certainly, when no attack control is provided for the virtual attacking unit, the target object may also attack the virtual attacking unit by using a trigger operation on the virtual attacking unit, or automatically attack a virtual attacking unit that enters an attack range of the target object. Regardless of whether a trigger operation is generated for the attack control or for the virtual attacking unit, it may be understood as an attack operation on the virtual attacking unit. If the target object generates an attack operation on the third virtual attacking unit, the terminal device may respond to the attack operation, and perform decrement display on the attacking unit attribute parameter corresponding to the third virtual attacking unit.

It may be understood that, in this application, a single attack reduction amount corresponding to each attack operation (the attack operation herein may be understood as an ordinary attack operation) (that is, a fixed reduction amount of a virtual health value of a virtual attacking unit each time an attack operation is generated for the virtual attacking unit; for example, if the single attack reduction amount is 50, and the virtual health value of the virtual attacking unit is 200, each time an attack is performed on the virtual attacking unit, the virtual health value of the virtual attacking unit is reduced by 50. After four attacks on the virtual attacking unit, the virtual health value of the virtual attacking unit is reduced to 0). It may be understood that when the target object generates an attack operation on the third virtual attacking unit, a virtual health value of the third virtual attacking unit decreases by a fixed value. Correspondingly, an attacking unit attribute parameter of the virtual attacking unit also decreases by a corresponding amount (for example, when the attacking unit attribute parameter is a progress bar with full progress, a corresponding progress amount is reduced). An amount reduced by the attacking unit attribute parameter may be determined based on a single attack reduction amount and the virtual health value of the third virtual attacking unit, so as to improve control accuracy for the virtual health value.

That is, a specific embodiment of performing, in response to an attack operation for the third virtual attacking unit, decrement display on the attacking unit attribute parameter of the third virtual attacking unit may be as follows: A single attack reduction amount corresponding to the attack operation may be obtained in response to an attack operation for the third virtual attacking unit; then, a virtual health value corresponding to the third virtual attacking unit may be obtained, and a proportion coefficient may be determined based on the single attack reduction amount and the virtual health value corresponding to the third virtual attacking unit; a single decrement amount of the attack operation for the attacking unit attribute parameter may be determined according to the proportion coefficient and the attacking unit attribute parameter; and decrement display may be performed on the attacking unit attribute parameter of the third virtual attacking unit according to the single decrement amount.

For ease of understanding, referring to FIG. 8 together, FIG. 8 is a schematic diagram of decrement display of an attacking unit attribute parameter according to an embodiment of this application. An example in which the single attack amount is 50, the virtual health value corresponding to the third virtual attacking unit is 200, and the attacking unit attribute parameter of the third virtual attacking unit is a progress bar 800a with full progress shown in FIG. 8. If the target object generates an attack operation on the third virtual attacking unit, the terminal device may determine, based on the single attack amount 50 and the virtual health value 200, that a proportion coefficient is ¼. Then, a length (for example, 8 cm) of the progress bar 800a with full progress may be multiplied by the proportion coefficient (¼), and a result (2 cm) obtained may be a progress amount (that is, a progress amount indicated by 2 cm) to be reduced for the progress bar 800a. The progress indicated by 2 cm may be referred to as a single decrement amount. Then, the terminal device may reduce the length of the progress bar 800a to 6 cm, to obtain the progress bar 800b shown in FIG. 8. In some embodiments, after the single decrement amount is determined, the terminal device may also keep the length of the progress bar 800a unchanged, and perform special display on a progress region indicated by 2 cm (for example, color change display, indicating that progress of this part has been cleared, and a virtual life amount of the virtual attacking unit has been reduced).

An attacking unit attribute parameter of each virtual attacking unit may be fixed, and does not change with a virtual health value. In a case in which a single attack amount of a user remains unchanged, because a virtual health value changes, a proportion coefficient changes, and a single decrement amount of an attack operation for an attacking unit attribute parameter also changes (a larger virtual health value indicates a smaller single decrement amount, and a quantity of attacks on a virtual attacking unit increases to make the attacking unit in a health depleted state).

In this application, the virtual health value of a virtual attacking unit on a player may be determined based on a building level of an opponent. In this case, the virtual health value of the third virtual attacking unit may be determined based on the second building level. A specific method may be as follows: A unit type to which the third virtual attacking unit belongs may be obtained. Then, a sign operation function corresponding to the unit type and a basic virtual health value corresponding to the third virtual attacking unit may be obtained. The virtual health value corresponding to the third virtual attacking unit may be determined according to the sign operation function, the second building level, and the basic virtual health value.

It may be understood that, in combat, a unit type to which each virtual attacking unit belongs may be a virtual identity type, and the virtual identity type may include a leader type and a non-leader type. In this application, a calculation function (which may be referred to as a sign operation function) may be set for the virtual attacking unit of the leader type, and is used for calculating a virtual health value (virtual life value) corresponding to the virtual attacking unit. A calculation function may also be set for a virtual attacking unit of a non-leader type, and is used for calculating a virtual health value corresponding to the virtual attacking unit. For ease of understanding, refer to formula (1). Formula (1) is a specific embodiment of calculating a virtual health value of a virtual attacking unit of the leader type.

$$S_1=(L_0+L_0*(\text{level}-1)*0.15)*1.35^{(\text{level}-1)} \qquad \text{Formula (1)}$$

$S_1$ in formula (1) may be used for representing a virtual health value of a virtual attacking unit of the leader type. $L_0$ may refer to a basic virtual life value of the virtual attacking unit of the leader type (that is, a basic virtual health value; in one embodiment, an initial virtual life value may be preset for each virtual attacking unit of the leader type, the initial virtual life value of each virtual attacking unit of the leader type may be the same, and the initial virtual life value may be referred to as a basic virtual health value). level may refer to a current contention building level (such as a second building level) of a virtual building of a second camp. It may be learned from formula (1) that, after the basic virtual health value of the virtual attacking unit of the leader type and the current building level of the virtual building of the second camp are obtained, a virtual sign parameter of the virtual attacking unit of the leader type may be determined by using formula (1).

For ease of understanding, refer to formula (2). Formula (2) is a specific embodiment of calculating a virtual health value of a virtual attacking unit of the non-leader type.

$$S_2=(L_0+L_0*(\text{level}-1)*0.15)*1.35^{(\text{level}-1)} \qquad \text{Formula (2)}$$

$S_2$ in formula (2) may be used for representing a virtual health value of a virtual attacking unit of the non-leader type. $L_0$ may refer to a basic virtual life value of the virtual attacking unit of the non-leader type (that is, a basic virtual health value; in one embodiment, an initial virtual life value may be preset for each virtual attacking unit of the non-leader type, the initial virtual life value of each virtual attacking unit of the non-leader type may be the same, and the initial virtual life value may be referred to as a basic virtual health value). level may refer to a current building level of a virtual building of a second camp. It may be learned from formula (2) that, after the basic virtual health value of the virtual attacking unit of the non-leader type and the current building level of the virtual building of the second camp are obtained, a virtual health value of the virtual attacking unit of the non-leader type may be determined by using formula (2).

That a sign operation function indicated by the foregoing formula (1) is the same as a sign operation function indicated by the foregoing formula (2) is merely an example for description. In an actual case, sign operation functions corresponding to virtual attacking units of different unit types may be different, that is, the sign operation function of the virtual attacking unit of the leader type and the sign operation function of the virtual attacking unit of the non-leader type may be different functions.

S503. Update and display the upgrade progress component based on a virtual resource corresponding to the virtual attacking unit in a case that the virtual attacking unit indicated by the attacking unit attribute parameter after decrement display is in a health depleted state.

Specifically, the terminal device may update and display the upgrade progress component based on a virtual resource corresponding to the virtual attacking unit in a case that the virtual attacking unit indicated by the attacking unit attribute parameter after decrement display is in a health depleted state. It may be understood that, in this application, a virtual resource may be allocated to some virtual attacking units. After attacking a virtual attacking unit that is allocated with a virtual resource and that is in a health depleted state, a target object may obtain a virtual resource corresponding to the virtual attacking unit. A virtual attacking unit that is allocated with a virtual resource may be referred to as a valid virtual attacking unit, and a virtual attacking unit that is not allocated with a virtual resource may be referred to as an invalid virtual attacking unit. The valid virtual attacking unit may form a valid attacking unit set. If a target object attacks a virtual attacking unit in a combat and causes the virtual attacking unit to be in a health depleted state, the terminal device may first detect the virtual attacking unit based on the valid attacking unit set to determine whether the virtual attacking unit is a valid virtual attacking unit, and when determining that the virtual attacking unit is a valid virtual attacking unit, allocate a virtual resource corresponding to the valid virtual attacking unit to the target object, and update and display the upgrade progress component based on the virtual resource corresponding to the virtual attacking unit. A specific embodiment may be as follows: A valid attacking unit set may be obtained in a case that the third virtual attacking unit indicated by the attacking unit attribute parameter after decrement display is in a health depleted state; and the valid attack object set may include N (N is a positive integer) valid virtual attacking units that are allocated with virtual resources. Then, the third virtual attacking unit may be detected based on the N valid virtual attacking units. If the N valid virtual attacking units include the third virtual attacking unit, the upgrade progress component may be updated and displayed based on the virtual resource corresponding to the third virtual attacking unit.

In one embodiment, a building level of a camp virtual building may be associated with game difficulty level. That is, the camp virtual building may represent current game difficulty level in a combat, and the current game difficulty level may be intuitively reflected by using the camp virtual building. When the building level is associated with the game difficulty level, a building level of a player may be associated with game difficulty level of the opponent. A higher building level of the player indicates higher game difficulty level of the opponent. Therefore, the two combat parties can quickly obtain virtual resources in the combat to upgrade the building level of the camp virtual building of the player, so that the game difficulty level of the opponent is higher, a game problem is greater, and a probability of game victory of the opponent is reduced.

It is to be understood that, a higher virtual health value of a virtual attacking unit makes it more difficult for a player to attack the virtual attacking unit to be in a health depleted state, and a longer time is consumed (the virtual attacking unit has more time to attack the camp virtual building). That is, the virtual health value of the virtual attacking unit may represent the game difficulty level in combat. In this case, by calculating the virtual health value of the virtual attacking unit by using the building level, the building level of the camp virtual building can be well associated with the game difficulty level, and the game difficulty level is quantified into a building level. In this case, the current game difficulty level can be intuitively presented in a manner of displaying the building level, and a game strategy can be formulated more conveniently and accurately by the player, thereby reducing the game threshold.

In one embodiment, a camp virtual building in a combat may be associated with game difficulty level. A virtual health value of a virtual attacking unit may be determined based on a building level of a camp virtual building, and the virtual health value of the virtual attacking unit may represent game difficulty level. Therefore, current difficulty of a game may be intuitively presented in a manner of displaying the building level of the camp virtual building in a combat, and a game strategy can be formulated more conveniently and accurately by the player, thereby reducing the game threshold. That is, in one embodiment, game difficulty level may be quantified into a building level. By displaying the building level, the game difficulty level can be intuitively presented, and the game threshold is reduced.

Figure 9:
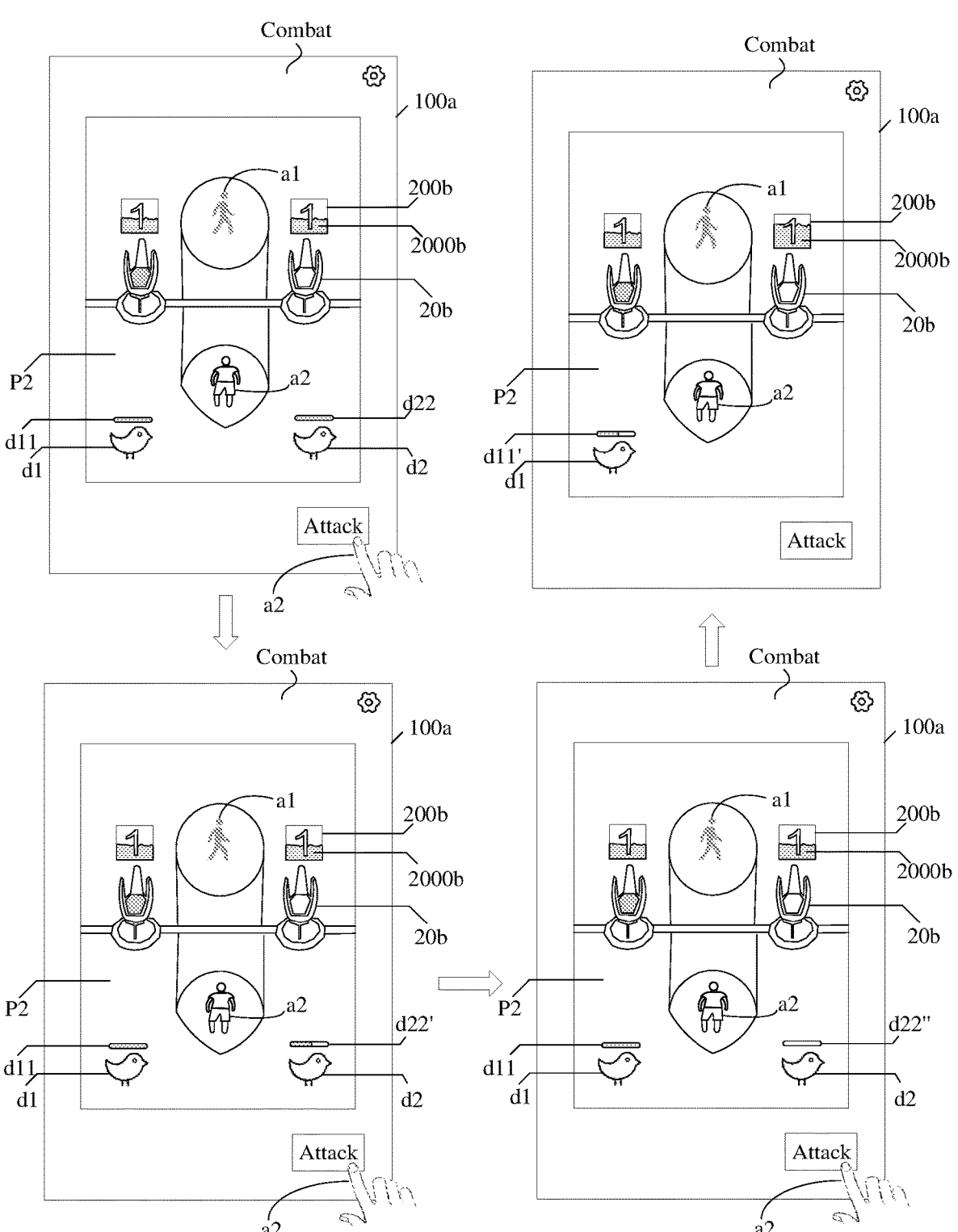
FIG. 9 is a schematic diagram of obtaining a virtual resource according to an embodiment of this application.

For ease of understanding a specific manner of obtaining a virtual resource by attacking a virtual attacking unit, refer to FIG. 9 together. FIG. 9 is a schematic diagram of a scenario of obtaining a virtual resource according to an embodiment of this application. The scenario may be a scenario in which a virtual resource is obtained by attacking a virtual attacking unit. As shown in FIG. 9, the foregoing scenario embodiment corresponding to FIG. 2 is used as an example. For example, the current building level (that is, the level 1) corresponding to the camp virtual building 20b (a camp virtual building of a camp in which the target object a2 is located), and the upgrade progress component 2000b that is upgraded from the current building level to a higher building level (such as a level 2) are displayed in the component display region 200b, where the upgrade progress component 2000b is a water level pattern. It may be understood that, for the upgrade progress component 2000b represented by using the water level pattern shown in FIG. 9, progress may be represented by using a water level height (progress height) corresponding to the upgrade progress component 2000b. When the water level height is a default initial value (such as 0), the progress is 0, and when the user a2 obtains a specific virtual resource, the water level height increases in an equal proportion (that is, the upgrade progress component 2000b is also updated and displayed; for example, the virtual resource is a game experience value; and when the user a2 obtains 100 game experience values, the water level height may be increased by 1 millimeter).

As shown in FIG. 9, the combat may include a virtual attacking unit d1 and a virtual attacking unit d2. In addition, for example, an attacking unit attribute parameter is in a progress bar pattern presentation form. The combat may further include an attacking unit attribute parameter d11 corresponding to the virtual attacking unit d1 and an attacking unit attribute parameter d22 corresponding to the virtual attacking unit d2. The attacking unit attribute parameter d11 may be used for representing a virtual life status of the virtual attacking unit d1, and the attacking unit attribute parameter d22 may be used for representing a virtual life status of the virtual attacking unit d2. The combat office may further include an attack control for a virtual attacking unit. When the user a2 generates a trigger operation on the virtual attacking unit, that is, an attack operation is generated on the virtual attacking unit, the terminal device 100a may respond to the attack operation, and perform decrement display on an attacking unit attribute parameter of the virtual attacking unit.

For example, as shown in FIG. 9, when the user a2 generates a trigger operation on an attack control once, the terminal device 100a may respond to the trigger operation, and perform decrement display on an attacking unit attribute parameter of a virtual attacking unit in an object display region P2 (a region in which the target object a2 is located) in a combat. Herein, by using an example in which decrement display is performed on an attacking unit attribute parameter of the virtual attacking unit d2, the terminal device 100a may perform decrement display on the attacking unit attribute parameter d22. It is assumed that each time an attack is performed on a virtual attacking unit, a virtual health value of the virtual attacking unit is reduced by 500, and the progress bar pattern is reduced proportionally by a length (that is, a length corresponding to 500). Herein, that the current virtual health value of the virtual attacking unit d2 is 1000 and the length of the progress bar pattern indicated by the attacking unit attribute parameter d22 is 0.5 centimeter is used as an example. When the user a2 generates a trigger operation on the attack control once, the virtual health value of the virtual attacking unit d2 decreases by 500 (that is, decreases by half), and the terminal device 100a may respond to this trigger operation and reduce the length of the progress bar of the attacking unit attribute parameter d22 by half (that is, perform decrement display on the attacking unit attribute parameter d22). Herein, for ease of distinction, an attacking unit attribute parameter obtained after half reduction may be referred to as an attacking unit attribute parameter d22'.

Further, when the attacking unit attribute parameter of the virtual attacking unit d2 is the attacking unit attribute parameter d22', the user a2 generates a trigger operation on the attack control again, and the virtual health value of the virtual attacking unit d2 decreases by 500. In this case, terminal device 100a may respond to this trigger operation, and reduce the progress bar length of the attacking unit attribute parameter d22 by half (that is, perform decrement display on the attacking unit attribute parameter d22). For ease of distinction herein, an attacking unit attribute parameter after half reduction may be referred to as an attacking unit attribute parameter d22". It is to be understood that, because a total virtual life value of the virtual attacking unit is 1000, when the virtual life value of the virtual attacking unit d2 is decremented twice, the virtual life value of the virtual attacking unit d2 is 0, and a progress bar indicated by the attacking unit attribute parameter d22" in the combat is also an empty value. In this case, the virtual attacking unit d2 is in a health depleted state. In this case, the upgrade progress component 2000b may be updated and displayed based on a virtual resource corresponding to the virtual attacking unit d2. For example, the current water level height of the upgrade progress component 2000b may be increased and displayed based on the virtual resource corresponding to the virtual attacking unit d2.

In addition, it may be understood that when the attacking unit attribute parameter of the virtual attacking unit d2 is the attacking unit attribute parameter d22", the terminal device 100a may hide the virtual attacking unit. If the user a2 generates a trigger operation on the attack control again, in this case, the terminal device 100a may select a virtual attacking unit (a virtual attacking unit other than the virtual attacking unit d2) from the combat, and perform decrement display on its attacking unit attribute parameter. For example, as shown in FIG. 9, when the user a2 generates a trigger operation on the attack control again, the terminal device 100a may respond to this operation, and perform decrement display on the attacking unit attribute parameter d11 of the virtual attacking unit d1 to obtain an attacking unit attribute parameter d11' shown in FIG. 9. When the virtual attacking unit d1 is in a health depleted state, the terminal device 100a may update and display the current upgrade progress component 2000b based on the virtual resource corresponding to the terminal device 100a (for example, continue to increase the water level height).

It may be understood that, a game may include a camp virtual building and a virtual attacking unit, and may further include a game resource prop (may be a prop that is in a combat and that can be used by a user to obtain a virtual resource, for example, the game resource prop may be a game virtual card, a game virtual fresh flower, or a game virtual garment). The terminal device may display a resource prop display region in a game interface. When a specific time (for example, an interval of 40 seconds or a time at which a total consumption value of a game virtual asset (such as a game coin) consumed by a user reaches a threshold) arrives, the terminal device may display the game resource prop in the resource prop display region, and a player (such as a target object) may obtain a corresponding virtual resource (such as a game experience value) by using the game resource prop. For example, each time the target object uses the game resource prop, a corresponding virtual resource may be obtained, and correspondingly, a building level of a camp virtual building is also updated. For ease of understanding, referring to FIG. 10, FIG. 10 is a schematic diagram of a process of updating and displaying an upgrade progress component according to an embodiment of this application. The procedure is that the combat in the embodiment corresponding to FIG. 3 further includes a resource prop display region that is used for displaying a game resource prop. A resource obtaining operation for a game interface is a process of performing a trigger operation on a game resource prop as an example. As shown in FIG. 10, the procedure may include at least the following S701-S703:

S701. Display resource obtaining prompt information for the game resource prop in the game interface in response to displaying the game resource prop in the resource prop display region; the resource obtaining prompt information being used for prompting that after the game resource prop is used by a target object, the target object has a resource obtaining permission; and the target object being an object corresponding to the virtual building of the first camp.

Specifically, the game resource prop may be displayed when resource prop display time arrives, and the resource prop display time may be a fixed preset time, for example, 1 minute after a combat starts. The resource prop display time may alternatively be a time that meets a preset condition. For example, the resource prop display time may be a time point at which a total consumption value of a game virtual asset (such as a game gold coin) consumed by a user in the combat reaches a consumption threshold. When the resource prop display time arrives, the terminal device may display the game resource prop in the resource prop display region of the game interface, and the user may obtain the virtual resource by using the game resource prop.

S702. Display a first drop region for the game resource prop in the game interface in response to a trigger operation for the game resource prop; the first drop region being a highlighted region associated with the first object display region; and the first object display region being a region in which the target object is located.

Specifically, the terminal device may provide, in combat, a use control for the game resource prop, and the target object may generate a use behavior for the game resource prop by performing a trigger operation on the use control. Certainly, when no use control is provided for the game resource prop, the target object may also use the game resource prop by performing a trigger operation on the game resource prop. Regardless of whether a trigger operation is performed for the use control or a trigger operation is performed on the game resource prop, it may be understood that the operation is performed on the game resource prop. If the target object generates a trigger operation on the game resource prop, the terminal device may respond to the trigger operation, display a region associated with a first object display region in the combat, and may perform highlight display (for example, magnified display, blinking display, highlight display, and using a specific color as a background color for display). The region may be used as a drop region of a triggered game resource prop in combat (which may be referred to as a first drop region).

S703. Update and display the upgrade progress component based on a virtual resource corresponding to the game resource prop in a case that the first drop region is in a building region range in which the virtual building of the first camp is located and the game resource prop is in the first drop region.

Specifically, the first drop region may be understood as a prop valid region. After the terminal device displays the first drop region in the combat, the target object may move the game resource prop to the first drop region by using a drag operation (it may be understood that moving the game resource prop to the prop valid region by using the drag operation means using the game resource prop). When the first drop region is located in a building region range of a camp virtual building of a camp in which the target object is located, and the game resource prop is located in the first drop region, the terminal device may obtain a virtual resource corresponding to the game resource prop, and update and display the upgrade progress component based on the virtual resource corresponding to the game resource prop.

It may be understood that the game resource prop may further be an attack prop that attacks a virtual attacking unit. After the target object uses the game resource prop, the game resource prop may have an attack effect on the virtual attacking unit (a sign state of the virtual attacking unit may be directly changed to a health depleted state, or a partial attacking unit attribute parameter of the virtual attacking unit may be reduced). The first drop region may be understood as a prop valid region. After the terminal device displays the first drop region in the combat, the target object may move the game resource prop to the first drop region by using a drag operation. When the first drop region is a path display sub-region in a first object display region (the first object display region is used for displaying a sub-region of the second path), and the game resource prop is in the first drop region, the terminal device may display, in the game interface (in the combat scenario), an attack animation (the attack animation may refer to an attack effect preset for an attack prop in the game) for a virtual attacking unit (for example, a third virtual attacking unit). The upgrade progress component is updated and displayed based on the virtual resource corresponding to the game resource prop in a case that playback of the attack animation ends. In some embodiments, it may be understood that, if the attack effect generated by the game resource prop on the virtual attacking unit is that the sign state of the virtual attacking unit is directly caused to be a health depleted state, in addition to updating and displaying the upgrade progress component based on the virtual resource corresponding to the game resource prop, the upgrade progress component may be further updated and displayed based on the virtual resource of the virtual attacking unit (that is, the current progress is increased twice in a row).

It may be understood that, it may be learned from the foregoing that, regardless of whether the first drop region is in a building region range of a camp virtual building, or an object attack range (such as a path display sub-region) in which a virtual attacking unit is located, when the target object moves the game resource prop to the first drop region by using a drag operation, the terminal device updates and displays the upgrade progress component based on the virtual resource corresponding to the game resource prop. In this application, corresponding virtual resources may be allocated to some game resource props. After the target object uses a game resource prop allocated with a virtual resource, the virtual resource corresponding to the game resource prop may be obtained (certainly, if the game resource prop used by the target object is a prop not allocated with a virtual resource, the target object does not obtain a virtual resource corresponding to the prop after using the prop). A game resource prop allocated with a virtual resource may be referred to as a valid game resource prop, and a game resource prop not allocated with a virtual resource may be referred to as an invalid game resource prop. Valid game resource props may form a valid resource prop set. If the target object uses a game resource prop in a combat, the terminal device may first detect the game resource prop based on the valid resource prop set to determine whether the game resource prop is a valid game resource prop, and when determining that the game resource prop is a valid game resource prop, allocate a virtual resource corresponding to the valid game resource prop to the target object, and update and display the progress upgrade component based on the virtual resource corresponding to the valid game resource prop.

A specific embodiment of detecting the game resource prop may be as follows: A valid resource prop set may be obtained. The valid resource prop set includes M valid game resource props (M is a positive integer). Then, the game resource prop may be detected based on the M valid game resource props. If the M valid game resource props include the game resource prop, the upgrade progress component may be updated and displayed based on a virtual resource corresponding to the game resource prop.

It may be understood that it may be learned from the foregoing that in this application, different virtual resources may be pre-allocated to a game resource prop. For example, the virtual resource is a game experience value, and a game experience value corresponding to a game resource prop A may be set to 500. After using the game resource prop, the target object may obtain 500 game experience values. In some embodiments, in a feasible embodiment, in a specific scenario, in one embodiment, a virtual resource corresponding to a game resource prop may be allocated according to a building level of a camp virtual building (in other words, after a corresponding virtual resource is allocated to a game resource prop, the game resource prop may be changed according to a building level). For example, combat includes a player 1 and a player 2. A building level of a camp virtual building of a camp in which the player 2 is located is a level 12, a building level of a camp virtual building of a camp in which the player 1 is located is a level 7, and the building level corresponding to the player 2 is far higher than the building level corresponding to the player 1. In this case, the game difficulty level of the player 1 is far higher than game difficulty level of the player 2. A building attribute parameter (representing a virtual life status) of the camp virtual building of the player 1 is also an invalid parameter, that is, the camp virtual building of the player 1 is in a health depleted state. That is, in combat, a combat result of the player 1 has an extremely high probability of being a game failure result. In this specific scenario, in order to accelerate a game process, so that a user does not need to continue to consume time in a combat with a determined combat result, a game experience value required for upgrading a building level of the player 2 from the level 12 to a level 13 (or higher) may be determined. Then, a virtual resource of the game resource prop is assigned with the virtual experience value. After player 2 uses the game resource prop, the virtual resource of the game resource prop may be directly used for upgrading the building level of the camp virtual building from the level 12 to the level 13 (or higher). In this way, game difficulty level of the player 1 becomes higher (for example, a virtual life value of a virtual attacking unit of the player 1 is higher, so that it is more difficult to make a sign state of a virtual attacking unit of the player 1 become a health depleted state). In this case, the virtual attacking unit for player 1 quickly attacks the camp virtual building of the player 1, so that the camp virtual building of the player 1 can quickly become the health depleted state, and the combat can be ended more quickly.

The target object is used as an example, and the virtual resource corresponding to the game resource prop may be determined according to an upgrade progress component of a building level of a camp virtual building of the target object. A specific embodiment may be as follows: A current upgrade virtual resource (which may be understood as current upgrade progress, and a virtual resource that has been obtained) indicated by the upgrade progress component, and a required upgrade virtual resource for upgrading from a first building level to a second building level (which may be understood as a total required virtual resource) may be obtained. A difference required upgrade virtual resource according to the current upgrade virtual resource and the required upgrade virtual resource is determined (which may be understood as an absent virtual resource upgraded from a current level); the virtual resource corresponding to the game resource prop may be determined according to the difference required upgrade virtual resource (the difference required upgrade virtual resource may be directly determined as the virtual resource corresponding to the game resource prop).

In one embodiment, a camp virtual building in a combat may be associated with game difficulty level. An attacking unit attribute parameter of a virtual attacking unit may be determined based on a building level of a camp virtual building, and the attacking unit attribute parameter of the virtual attacking unit may represent game difficulty level.

Therefore, current difficulty of a game may be intuitively presented in a manner of displaying the building level of the camp virtual building in a combat, and a game strategy can be formulated more conveniently and accurately by the player (for example, the virtual resource is quickly obtained by using the game resource prop multiple times to upgrade the building level, so as to increase the game difficulty level of the opponent), thereby reducing the game threshold. That is, in one embodiment, game difficulty level may be quantified into a building level. By displaying the building level, the game difficulty level can be intuitively presented, and the game threshold is reduced.

Figure 11:
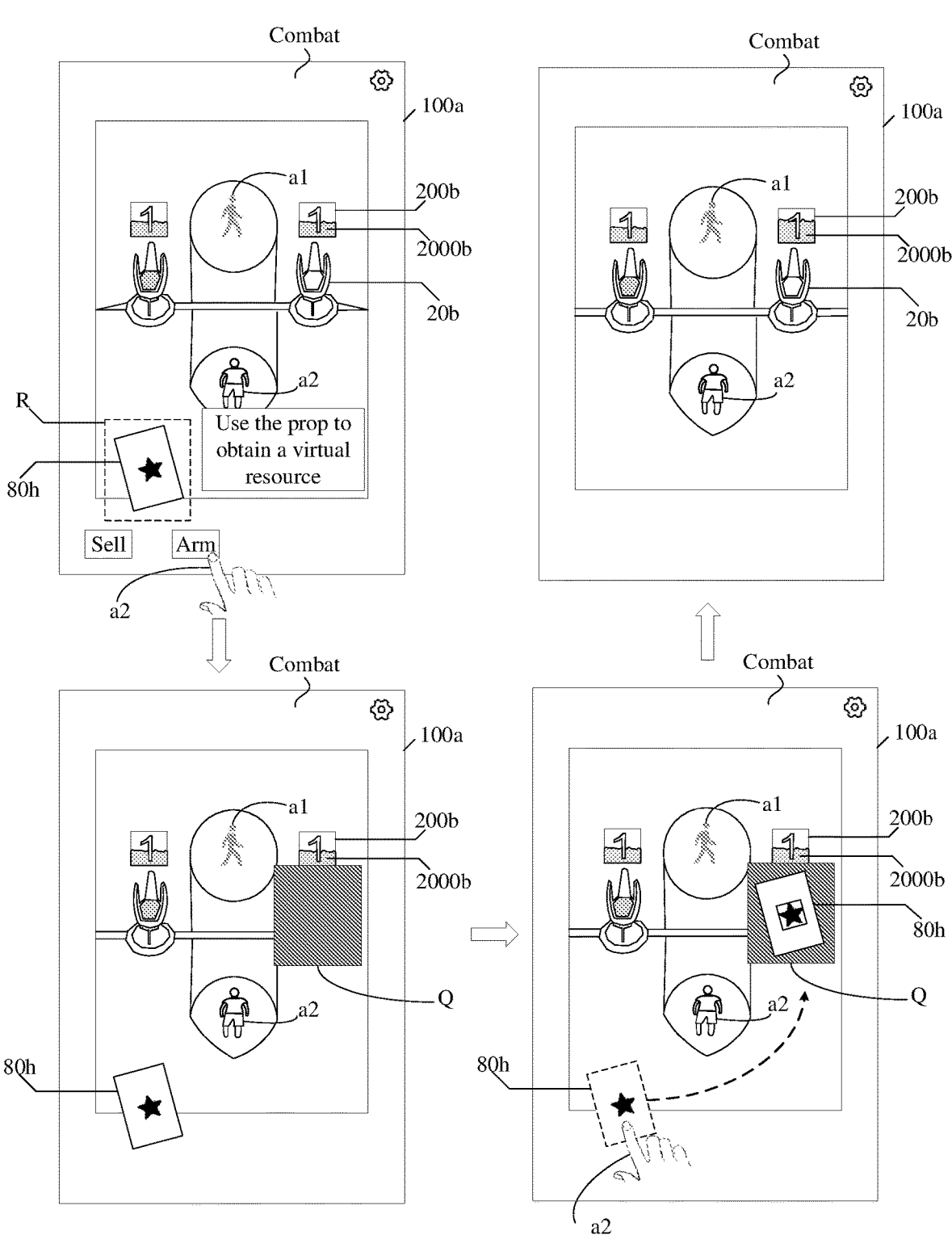
FIG. 11 is a schematic diagram of obtaining a virtual resource according to an embodiment of this application.

For ease of understanding a specific manner of obtaining a virtual resource by using a game resource prop, refer to FIG. 11 together. FIG. 11 is a schematic diagram of another scenario of obtaining a virtual resource according to an embodiment of this application. The scenario may be a scenario in which a virtual resource is obtained by using a game resource prop. As shown in FIG. 11, the foregoing scenario embodiment corresponding to FIG. 2 is used as an example. For example, the current building level (that is, the level 1) corresponding to the camp virtual building 20*b* (a camp virtual building of a camp in which the target object a2 is located), and the upgrade progress component 2000*b* that is upgraded from the current building level to a higher building level (such as a level 2) are displayed in the component display region 200*b*, where the upgrade progress component 2000*b* is a water level pattern. It may be understood that, for the upgrade progress component 2000*b* represented by using the water level pattern shown in FIG. 11, progress may be represented by using a water level height (progress height) corresponding to the upgrade progress component 2000*b*. When the water level height is a default initial value (such as 0), the progress is 0, and when the user a2 obtains a specific virtual resource, the water level height increases in an equal proportion (that is, the upgrade progress component 2000*b* is also updated and displayed; for example, the virtual resource is a game experience value; and when the user a2 obtains 100 game experience values, the water level height may be increased by 1 millimeter).

As shown in FIG. 11, the combat interface may include a resource prop display region R. When system time arrives at resource prop display time, the terminal device 100*a* may display a game resource prop 80*h* in the resource prop display region R in the combat interface, or may display, on the combat interface, resource obtaining prompt information for the game resource prop 80*h* (as shown in a prompt text "Use the prop to obtain a virtual resource" in FIG. 11). The resource obtaining prompt information may be used for instructing the user a2 to use the game resource prop 80*h*. In addition, as shown in FIG. 11, terminal device 100*a* may simultaneously display an arm control (which may be understood as a use control) and a sell control for the game resource prop 80*h*. The user a2 may use the game resource prop by performing a trigger operation on the arm control, or may sell the game resource prop by performing a trigger operation on the sell control. After the user a2 sells the game resource prop, the terminal device 100*a* may allocate a sold virtual asset to a bound account of the user a2 in the game application. The sold virtual asset cannot be used for updating the progress of the upgrade progress component. The sold virtual asset and the virtual resource used for updating the progress of the upgrade progress component are different resources. For example, the virtual resource used for updating the upgrade progress component is a game experience value, and the sold virtual asset may be a virtual resource different from the game experience value (for example, a game score, a game diamond, or a game gold coin).

As shown in FIG. 11, when the user a2 generates a trigger operation on the arm control, the terminal device 100*a* may respond to the trigger operation, and display a drop region Q on the combat interface, where the drop region Q is a prop valid region, and the user a2 may drag the game resource prop 80*h* to the drop region Q by using a drag operation. For example, as described in FIG. 11, after the user a2 drags the game resource prop 80*h* to the drop region Q, because the drop region Q is in a building region range in which the camp virtual building 20*b* is located, the terminal device 100*a* may update the upgrade progress component 2000*b* based on the virtual resource corresponding to the game resource prop 80*h*. For example, a current water level of the upgrade progress component 2000*b* may be increased and displayed based on the virtual resource corresponding to the game resource prop 80*h*.

Figure 12:
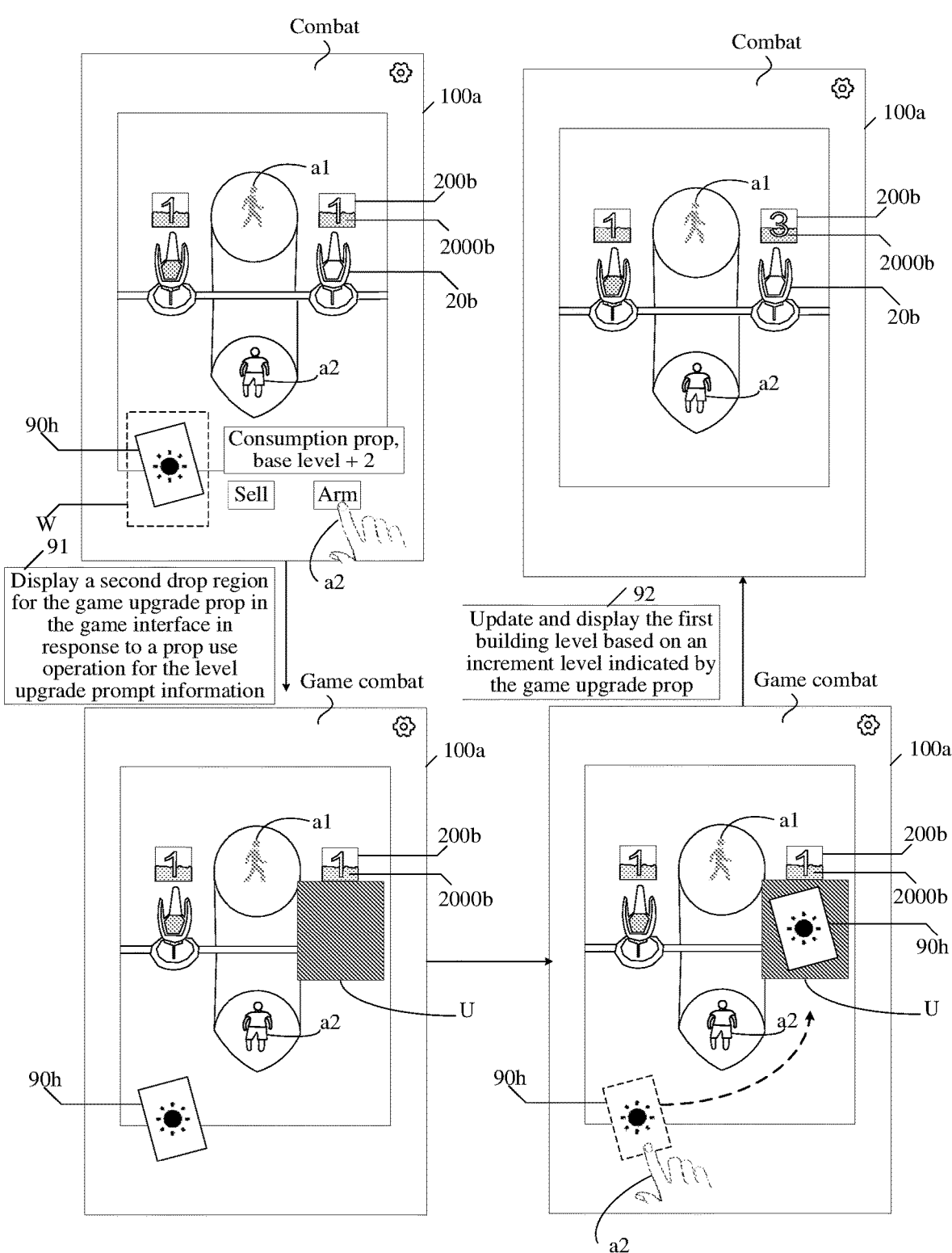
FIG. 12 is a schematic diagram of upgrading a building level based on a game upgrade prop according to an embodiment of this application.

It may be understood that the game interface (that is, the combat interface) may include a game resource prop. After using the game resource prop, the target object may obtain a corresponding virtual resource. The virtual resource may be used for updating the upgrade progress component. In some embodiments, the game interface may further include an upgrade prop display region that is used for displaying a game upgrade prop (a prop used for level upgrading of a camp virtual building). When the system time reaches the upgrade prop display time, the terminal device may display the game upgrade prop in the upgrade prop display region. After the user uses the game upgrade prop, the terminal device may directly upgrade and display the building level of the camp virtual building of the target object. For ease of understanding, refer to FIG. 12 together. FIG. 12 is a schematic diagram of a scenario of upgrading a building level based on a game upgrade prop according to an embodiment of this application. As shown in FIG. 12, the foregoing scenario embodiment corresponding to FIG. 2 is used as an example. For example, the current building level (that is, the level 1) corresponding to the camp virtual building 20*b* (a camp virtual building of a camp in which the target object a2 is located), and the upgrade progress component 2000*b* that is upgraded from the current building level to a higher building level (such as a level 2) are displayed in the component display region 200*b*, where the upgrade progress component 2000*b* is a water level pattern. It may be understood that, for the upgrade progress component 2000*b* represented by using the water level pattern shown in FIG. 12, progress may be represented by using a water level height (progress height) corresponding to the upgrade progress component 2000*b*. When the water level height is a default initial value (such as 0), the progress is 0, and when the user a2 obtains a specific virtual resource, the water level height increases in an equal proportion (that is, the upgrade progress component 2000*b* is also updated and displayed; for example, the virtual resource is a game experience value; and when the user a2 obtains 100 game experience values, the water level height may be increased by 1 millimeter).

As shown in FIG. 12, the combat interface may include an upgrade prop display region W. When the system time arrives at upgrade prop display time, the terminal device 100*a* may display a game upgrade prop 90*h* in the upgrade prop display region W, and display, on the combat interface, level upgrade prompt information (as shown in prompt text information "Consumption prop, base level+2" in FIG. 12) for the game upgrade prop 90*h* in the combat interface, and an arm control (which may be understood as a use control) and a sell control for the level upgrade prompt information.

The user a2 may use the game upgrade prop by performing a trigger operation on the arm control, and sell the game upgrade prop by performing a trigger operation on the sell control.

As shown in FIG. 12, when the user a2 generates a trigger operation on the arm control, that is, generates a prop use operation on the level upgrade prompt information, the terminal device 100*a* may perform step 91 shown in FIG. 12, that is, respond to the prop use operation on the level upgrade prompt information, and display, on the game interface, a drop region (that is, a second drop region) for the game upgrade prop 90*h*. For example, as shown in FIG. 12, the terminal device 100*a* may respond to this trigger operation, and display a drop region U (that is, a second drop region) on the combat interface. The drop region U is a prop valid region for the game upgrade prop 90*h*. The user a2 may drag the game upgrade prop 90*h* to the drop region U by using a drag operation. For example, as described in FIG. 12, after the user a2 drags the game upgrade prop 90*h* to the drop region U, because the drop region U is in a building region range in which the camp virtual building 20*b* is located, the terminal device 100*a* may directly upgrade the building level of the camp virtual object 20*b* by two levels (that is, update and display it as a level 3). In addition, it may be understood that, when the building level is directly upgraded and updated, the upgrade progress component 2000*b* thereof may remain unchanged, that is, a current water level height of the upgrade progress component 2000*b* may remain unchanged.

It may be understood that, in a feasible embodiment, in a combat scenario, a game skill prop (such as a fireball skill prop, a frozen skill prop, or a power enhancement skill prop) may be further provided. In addition to an ordinary attack operation for a virtual attacking unit, a player (such as a target object) may attack the virtual attacking unit by using the game skill prop. In one embodiment, each time the target object uses one game skill prop, a corresponding virtual resource may be obtained. Correspondingly, the upgrade progress component of the camp virtual building is also updated accordingly. That is, the game interface may be further used for displaying a skill prop display region of the game skill prop. The terminal device may display the game skill prop in the skill prop display region. The target object may use any game skill prop in the skill prop display region. When a game skill prop is used, a corresponding virtual resource may be obtained. For ease of understanding, referring to FIG. 13, FIG. 13 is a schematic diagram of a process of updating and displaying an upgrade progress component according to an embodiment of this application. The procedure is that the game interface in the embodiment corresponding to FIG. 5 further includes a skill prop display region used for displaying a game skill prop. A resource obtaining operation for a game interface is a process of performing a trigger operation on a target game skill prop in a skill prop display region as an example. As shown in FIG. 13, the procedure may include at least the following S901-S904:

S901. Obtain a current total virtual asset of a target object, and determine a set of available game skill props based on the current total virtual asset; a consumable virtual asset corresponding to each available game skill prop in the set of available game skill props being less than the current total virtual asset.

Specifically, the virtual asset herein is different from a virtual resource used for upgrading a building level, and the two may be different resources. For example, when the virtual resource used for upgrading the building level is a game score, the virtual asset may be another resource such as a game gold coin, a game experience value, a game diamond, or the like that is different from the game score. A current total virtual asset of a target object may be a total amount of virtual assets that are owned by the target object in a combat at a moment. For each game skill prop, a virtual asset of the target object needs to be used for redeeming. Based on the current total virtual asset, a game skill prop set (that is, a redeemable game skill prop set) may be determined. A consumable virtual asset corresponding to each available game skill prop in a set of available game skill props is less than the current total virtual asset.

That is, in combat, the target object needs to consume a virtual asset to use a game skill prop. In an example in which the current total virtual asset is 300 game gold coins, a consumable virtual asset of a game skill prop 1 (such as a fireball skill card) is 100 gold coins, and a consumable virtual asset of a game skill prop 2 (such as a frozen skill card) is 120 gold coins. Because both 100 and 120 are less than 300, both the game skill prop 1 and the game skill prop 2 may be used as available game skill props, and the game skill prop 1 and the game skill prop 2 may form a set of available game skill props.

S902. Display, in the skill prop display region, the current total virtual asset, the set of available game skill props, and the consumable virtual asset corresponding to each available game skill prop in the set of available game skill props.

Specifically, the terminal device may display, in the skill prop display region, the current total virtual asset, the available skill prop display region, and the consumable virtual asset corresponding to each available skill prop display region.

S903. Display, in the game interface in response to a drag operation for a target game skill prop in the set of available game skill props, a skill animation corresponding to the target game skill prop; the drag operation being used for moving the target game skill prop from the skill prop display region to an object display sub-region; the object display sub-region being a sub-region in which a target object in the first object display region is located; and the target object being an object corresponding to the virtual building of the first camp.

Specifically, a player can purchase an available game skill prop by dragging the game skill prop to a region (used for displaying the player's virtual role in a combat) in which a virtual role is located, to attack a virtual attacking unit by using the game skill prop, thereby reducing an attacking unit attribute parameter of the virtual attacking unit. The target object is used as an example. If the target object can use a game skill prop (which may be referred to as a target game skill prop) in the set of available game skill props, and drag the game skill prop from a skill prop display region to an object display sub-region (a sub-region in which the target object is located in the first object display region), it may be considered that the target object expects to purchase the target game skill prop (expects to use the target game skill prop), the terminal device may respond to this drag operation, and display, on the game interface, a skill animation corresponding to the target game skill prop. The skill animation may be understood as an attack animation that attacks a virtual attacking unit (such as a third virtual attacking unit) by using a skill of the target game skill prop. It may be understood that the target game skill prop may be used for attacking a virtual attacking unit (for example, a third virtual attacking unit in a second path) by using the target game skill prop. After the target object drags the target game skill prop, the terminal device may display, on the game interface, an attack special effect (that is, display a skill animation corresponding to the target game skill prop) for the third virtual attacking unit. In addition, when the skill animation is played, decrement display may be performed on an attacking unit attribute parameter of the third virtual attacking unit. For example, the target game skill prop is a fireball skill prop. After the target object drags the fireball skill prop to the object display sub-region, the terminal device may display, on the game interface, an animation of attacking a virtual attacking unit by using a fireball, and continuously perform decrement display on an attacking unit attribute parameter of the virtual attacking unit until playback of the skill animation ends.

It may be understood that, in one embodiment, a held skill prop display region (which may be referred to as a prop storage region) used for storing a held skill prop may be disposed in the combat scenario. Each time a player purchases a game skill prop, the game skill prop may be used as a held skill prop of the player, and the held skill prop may be displayed in a vacant sub-region of the held skill prop display region. When no vacant sub-region exists in the held skill prop display region, the player no longer has a purchase permission for another available game skill prop. In this case, the player may purchase a new vacant sub-region in a manner of consuming a virtual asset, and then obtain a new vacant sub-region before continuing to purchase a new game skill prop. The player may also sell the held game skill prop, to change a sub-region in which a game skill prop is stored into a vacant sub-region. In this case, the player can continue to purchase a new game skill prop. That is, the game interface further includes the held skill prop display region used for displaying the held game skill prop. When the target object generates a drag operation on the target game skill prop and expects to purchase the target game skill prop, the terminal device may respond to the drag operation for the target game skill prop in the set of available game skill props, first perform region detection on the held skill prop display region, and then display the target game skill prop in a vacant sub-region when detecting that there is a vacant sub-region in the held skill prop display region, and display, in the game interface, the skill animation corresponding to the target game skill prop. If it is detected that there is no vacant sub-region in the held skill prop display region, the terminal device may display one piece of prompt information in the game interface, which is used for prompting the target object that there is no vacant sub-region at present, and the target object cannot purchase (or use) the target game skill prop.

S904. Perform, in a case that playback of the skill animation ends, decrement display on the current total virtual asset based on a consumable virtual asset corresponding to the target game skill prop, and update and display the upgrade progress component based on a virtual resource corresponding to the target game skill prop.

Specifically, when the playback of the skill animation ends, it may be understood that the target game skill prop is successfully used by the target object, the terminal device may perform decrement display on a current total virtual asset based on a consumable virtual asset corresponding to the target game skill prop, and update and display the upgrade progress component based on the virtual resource corresponding to the target game skill prop.

In one embodiment, a camp virtual building in a combat may be associated with game difficulty level. An attacking unit attribute parameter of a virtual attacking unit may be determined based on a building level of a camp virtual building, and the attacking unit attribute parameter of the virtual attacking unit may represent game difficulty level. Therefore, current difficulty of a game may be intuitively presented in a manner of displaying the building level of the camp virtual building in a combat, and a game strategy can be formulated more conveniently and accurately by the player (for example, the virtual resource is quickly obtained by using auxiliary skills multiple times to upgrade the building level, so as to increase the game difficulty level of the opponent), thereby reducing the game threshold. That is, in one embodiment, game difficulty level may be quantified into a building level. By displaying the building level, the game difficulty level can be intuitively presented, and the game threshold is reduced.

Figure 14:
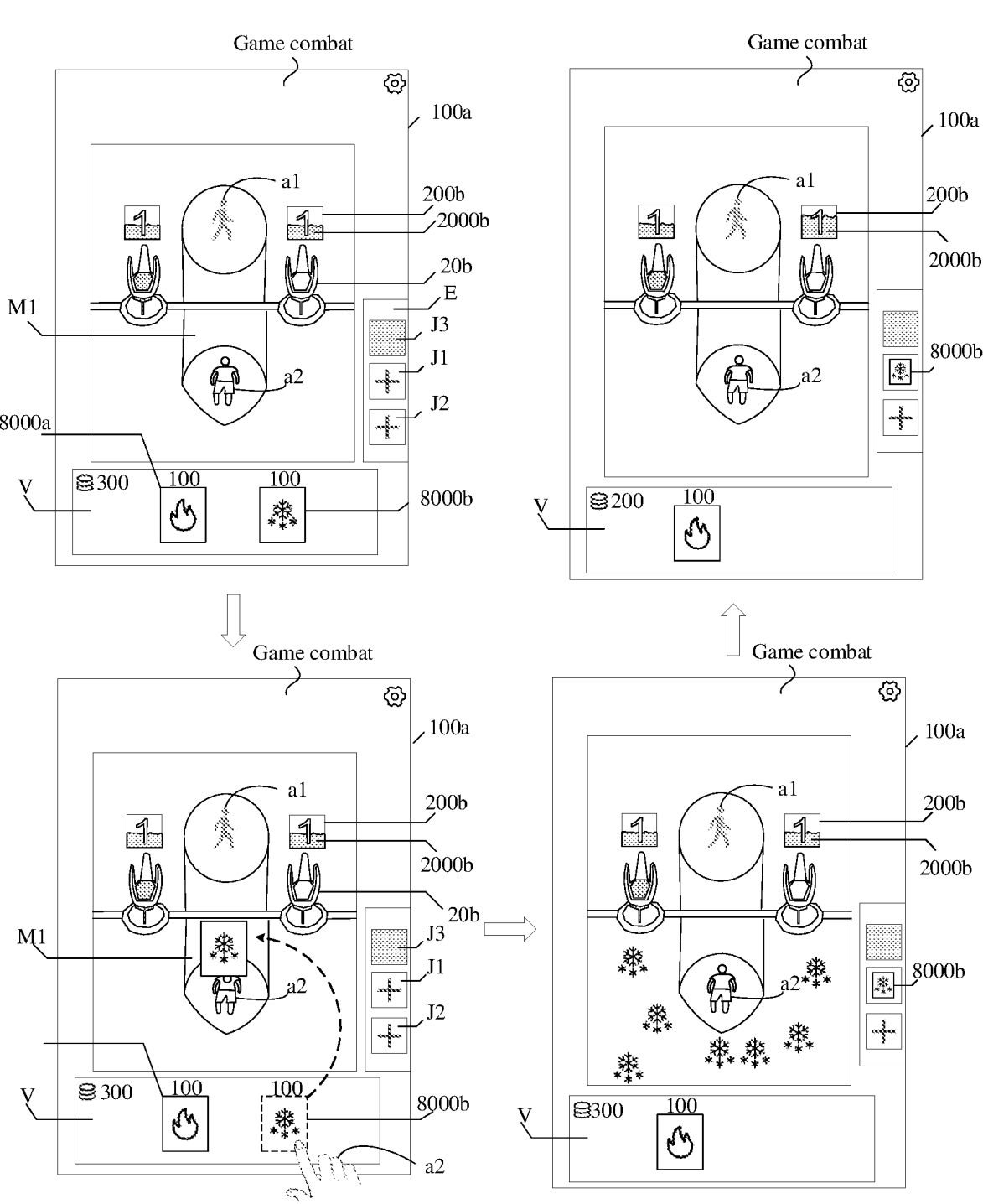
FIG. 14 is a schematic diagram of another scenario of obtaining a virtual resource according to an embodiment of this application.

For ease of understanding a specific manner of obtaining a virtual resource by using a game skill prop, refer to FIG. 14 together. FIG. 14 is a schematic diagram of another scenario of obtaining a virtual resource according to an embodiment of this application. The scenario may be a scenario in which a virtual resource is obtained by using a game skill prop. As shown in FIG. 14, the foregoing scenario embodiment corresponding to FIG. 2 is used as an example. For example, the current building level (that is, the level 1) corresponding to the camp virtual building 20b (a camp virtual building of a camp in which the target object a2 is located), and the upgrade progress component 2000b that is upgraded from the current building level to a higher building level (such as a level 2) are displayed in the component display region 200b, where the upgrade progress component 2000b is a water level pattern. It may be understood that, for the upgrade progress component 2000b represented by using the water level pattern shown in FIG. 11, progress may be represented by using a water level height (progress height) corresponding to the upgrade progress component 2000b. When the water level height is a default initial value (such as 0), the progress is 0, and when the user a2 obtains a specific virtual resource, the water level height increases in an equal proportion (that is, the upgrade progress component 2000b is also updated and displayed; for example, the virtual resource is a game experience value; and when the user a2 obtains 100 game experience values, the water level height may be increased by 1 millimeter).

As shown in FIG. 11, the combat interface may include a skill prop display region V. It is assumed that a game gold coin (current total virtual asset) owned by a current user a2 is 300, and consumable virtual assets corresponding to a frozen skill prop 8000b and a fireball skill prop 8000a are both 100, the frozen skill prop 8000b and the fireball skill prop 8000a may be both used as a set of available game skill props. The frozen skill prop 8000b and its corresponding consumable virtual asset (that is, 100 gold coins need to be consumed), and the fireball skill prop 8000a and its corresponding consumable virtual asset (that is, 100 gold coins need to be consumed) may be displayed in the skill prop display region V. In addition, the current total virtual asset (i.e., 300 gold coins) may be displayed in the skill prop display region V.

As shown in FIG. 11, the combat interface may further display a held skill prop display region E. The held skill prop display region E may include a sub-region J1, a sub-region J2, and a sub-region J3 that are used for displaying held skill props. The sub-region J1 and the sub-region J2 that display a plus sign pattern may be understood as vacant sub-regions, and the sub-region J3 that does not display a plus sign pattern may be understood as a locked sub-region. Currently, the sub-region J3 cannot store a game skill prop. If the user a2 wants to switch the sub-region J3 to a vacant sub-region, the user a2 may perform redeeming purchase in a manner of consuming a virtual asset (game gold coin). It may be understood that when there is a vacant sub-region J1 and a vacant sub-region J2 in the held skill prop display region E, the user a2 may purchase a maximum of two game skill props in the skill prop display region V in a manner of consuming game coins.

As shown in FIG. 14, when the user a2 drags the frozen skill prop 8000b from the skill prop display region V to the object display sub-region M1 in the region P2, the terminal device 100a may, in response to the drag operation, add the frozen skill prop 8000b to the vacant sub-region J2 (that is, the frozen skill prop 8000b is displayed in the vacant sub-region J2), and display, on the combat interface, a skill animation (a skill effect on a virtual attacking unit in the region P2) for the frozen skill prop 8000b. Herein, for example, the skill animation may be a dynamic snowflake. When the snowflake falls onto a virtual attacking unit, the snowflake can freeze the virtual attacking unit, and an attacking unit attribute parameter of the virtual attacking unit will accordingly decrease. When playback of the skill animation ends, the current total virtual asset 300 in the skill prop display region V may be displayed in a decrement manner (that is, the gold coin consumed by the frozen skill prop 8000b is subtracted), and is reduced and displayed as 200 (or in a playback process of the skill animation, the current total virtual asset 300 in the skill prop display region V may be displayed in a decrement manner). In addition, the terminal device 100a may update the upgrade progress component 2000b based on the virtual resource corresponding to the frozen skill prop 8000b. For example, the current water level height of the upgrade progress component 2000b may be increased and displayed based on the virtual resource corresponding to the frozen skill prop 8000b.

It may be understood that, in one embodiment, a skill release time may be set for each game skill prop. If a player redeems a game skill prop by using a virtual asset, that is, holds the game skill prop, in a case in which the player does not sell the game skill prop (that is, when the game skill prop is displayed in the skill prop display region), the terminal device may release, according to the skill release time of the game skill prop, a skill corresponding to the game skill prop (display a skill animation corresponding to the game skill prop), and attack a virtual attacking unit by using the released skill. For example, if the skill release time of the frozen skill prop 8000b is every 5 s, when the user a2 drags the frozen skill prop 8000b to the object display sub-region M1, a skill animation corresponding to the frozen skill prop 8000b may be displayed once. As a result, the skill animation corresponding to the frozen skill prop 8000b can be displayed every 5 s (that is, the frozen skill prop 8000b attacks the virtual attacking unit every 5 s) After the user a2 redeems the frozen skill prop 8000b, the upgrade progress component 2000b may be updated and displayed based on the virtual resource corresponding to the frozen skill prop 8000b. When the player already holds the frozen skill prop 8000b, and subsequently attacks the virtual attacking unit by using the frozen skill prop 8000b, the upgrade progress component 2000b may no longer be updated and displayed based on the virtual resource corresponding to the frozen skill prop 8000b.

Figure 15:
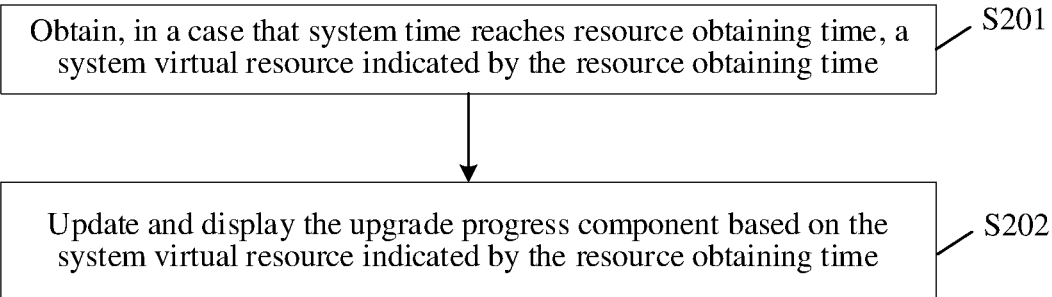
FIG. 15 is a schematic flowchart of obtaining a system virtual resource according to an embodiment of this application.

It may be understood that, it may be learned from the foregoing that, in a combat, a user may obtain a virtual resource based on a resource obtaining operation, so as to update an upgrade progress component, thereby upgrading a building level. In a feasible embodiment, a virtual resource may be systematically and automatically allocated to a user in a combat, that is, the user may obtain a system virtual resource allocated by the system without any operation when system time arrives, and the system virtual resource may also be used for updating an upgrade progress component. For ease of understanding, refer to FIG. 15 together. FIG. 15 is a schematic flowchart of obtaining a system virtual resource according to an embodiment of this application. As shown in FIG. 15, the procedure may include at least the following S201-S202:

S201. Obtain, in a case that system time reaches resource obtaining time, a system virtual resource indicated by the resource obtaining time.

Specifically, in this application, the resource obtaining time may be preset, and different system virtual resources are allocated to different resource obtaining time. When the system time reaches the resource obtaining time, the terminal device may obtain the system virtual resource indicated by the resource obtaining time, and allocate the system virtual resource to the user.

It may be understood that, in this application, different configuration time intervals may be preset, and corresponding system virtual resources (which may be referred to as configuration virtual resources) may be configured for different configuration time intervals. In this case, when the resource obtaining time arrives, a time interval in which resource obtaining time is located may be viewed, and a configuration system virtual resource corresponding to the time interval may be used as a system virtual resource indicated by the resource obtaining time. A specific embodiment may be as follows: A resource mapping table may be obtained in a case that the system time reaches the resource obtaining time; the resource mapping table may include a mapping relationship between a configuration time interval set and a configuration virtual resource set, and a mapping relationship exists between one configuration time interval and one configuration virtual resource; and then, a configuration time interval to which the resource obtaining time belongs in the configuration time interval set may be determined as a target configuration time interval. Then, a configuration virtual resource that is in the configuration virtual resource set and that has a mapping relationship with the target configuration time interval may be determined as the system virtual resource indicated by the resource obtaining time.

For example, the resource obtaining time may be set to every 5 seconds after entering the combat, that is, a moment of entering the combat may be determined as 0 s. Starting from 0 s, 5 s, 10 s, 15 s, 20 s, and . . . are all resource obtaining time. A configuration time interval may be defined from 0 s to 10 s (including 10 s), a configuration time interval may be defined from 10 s to 20 s (including 20 s, but not including 10 s), and a configuration time interval may be defined from 20 s to 30 s (including 30 s, but not including 20 s). As game time advances, a configuration system virtual resource corresponding to the configuration time interval may be improved. For example, a configuration system virtual resource corresponding to 0 s and 10 s may be set to 100 game experience values, a configuration system virtual resource corresponding to 10 s to 20 s may be set to 150 game experience values, and a configuration system virtual resource corresponding to 20 s to 30 s s may be set to 200 game experience values, and . . . . When the system time reaches 5 s of the game time, the user can obtain 100 game experience values. When the system time reaches 15 s of the game time, the user can obtain 150 game experience values.

S202. Update and display the upgrade progress component based on the system virtual resource indicated by the resource obtaining time.

Specifically, the terminal device may update and display the upgrade progress component based on the system virtual resource indicated by the resource obtaining time.

In one embodiment, a camp virtual building in a combat may be associated with game difficulty level. Therefore, current difficulty of a game may be intuitively presented in a manner of displaying the building level of the camp virtual building in a combat, and a game strategy can be formulated more conveniently and accurately by the player, thereby reducing the game threshold.

Figure 16:
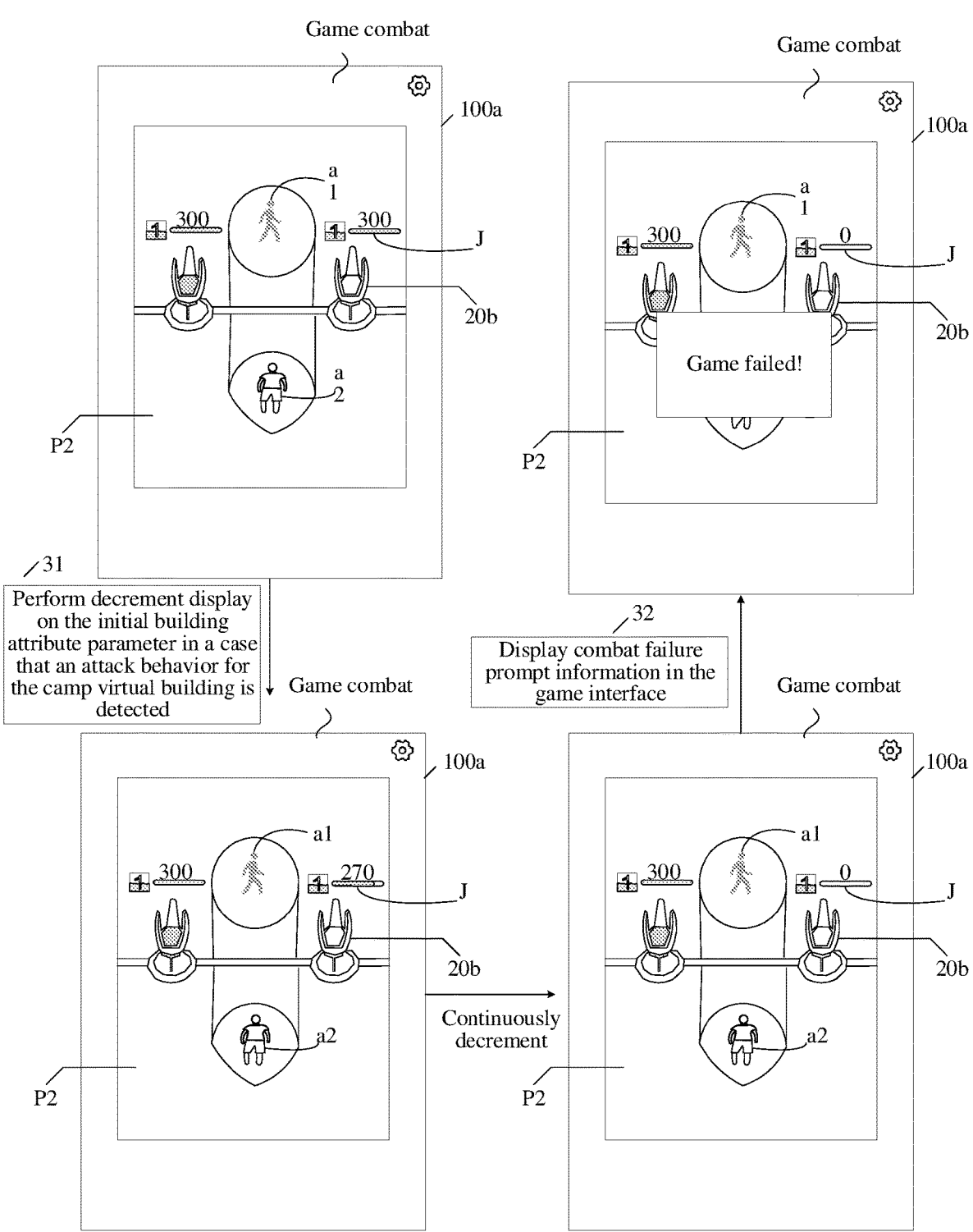
FIG. 16 is a schematic diagram of prompting a game failure according to an embodiment of this application.

It may be understood that, it may be learned from the foregoing description that, in a combat, there may be camp virtual buildings of both combat parties, building levels of the camp virtual buildings, and upgrade progress components corresponding to the building levels of the camp virtual buildings. In addition, the combat may include a virtual attacking unit, and the virtual attacking unit attacks the camp virtual building, so that a virtual life amount of the camp virtual building gradually decreases. When the virtual life amount of the camp virtual building is an invalid value, the camp virtual building is in an invalid state, and may represent that a corresponding player has a combat failure result. In this application, the virtual life value for the camp virtual building can be displayed in the combat, and combat failure prompt information can be displayed in the combat after the combat failure result of the player. For ease of understanding, referring to FIG. 16 together, FIG. 16 is a schematic diagram of a scenario of prompting a game failure according to an embodiment of this application. As shown in FIG. 16, a combat interface may include region P2 used for displaying a target object a2 (a virtual role of the user a2 in the combat), and may include a camp virtual building 20b of a camp in which the target object a2 is located. A terminal device 100a may display, on a combat interface, an initial building attribute parameter for the camp virtual building 20b (which may be understood as a virtual life amount, and may be presented by using a progress bar with full progress; when the progress bar does not have progress or a length of the progress bar decreases to a preset length, the camp virtual building is in an invalid state). Herein, a virtual health value of the camp virtual building 20b may be 300, and the initial building attribute parameter is represented by a progress bar pattern J.

Further, when the virtual attacking unit generates an attack behavior on the camp virtual building 20b, the terminal device 100a may also detect the attack behavior. Then, the terminal device 100a may perform S31 shown in FIG. 16, that is, when the terminal device 100a detects an attack behavior for the camp virtual building 20b, the terminal device 100a may display the initial building attribute parameter and the virtual health value in a decrement manner. For example, as shown in FIG. 16, the terminal device 100a may reduce the virtual health value to 270, and perform corresponding decrement display on the initial building attribute parameter J (reduce the progress bar length, or clear progress in some progress regions).

Further, the terminal device 100a may continuously detect an attack behavior for the camp virtual building 20b, and the terminal device may continuously display the virtual health value and the initial building attribute parameter J of the camp virtual building 20b in a decrement manner. When the virtual health value is 0 and the progress bar pattern does not exist (or the progress indicated by the progress bar is 0), the camp virtual building indicated by the initial building attribute parameter J is in an invalid state (which may be understood as a health depleted state). In this case, terminal device 100a may display combat failure prompt information on the combat interface. That is, when the camp virtual building indicated by the initial building attribute parameter after decrement display is in an invalid state, the terminal device 100a may perform step 32 shown in FIG. 16, that is, display the combat failure prompt information in the combat. As shown in FIG. 16, the combat failure prompt information may be text prompt information "Game failed".

Figure 17:
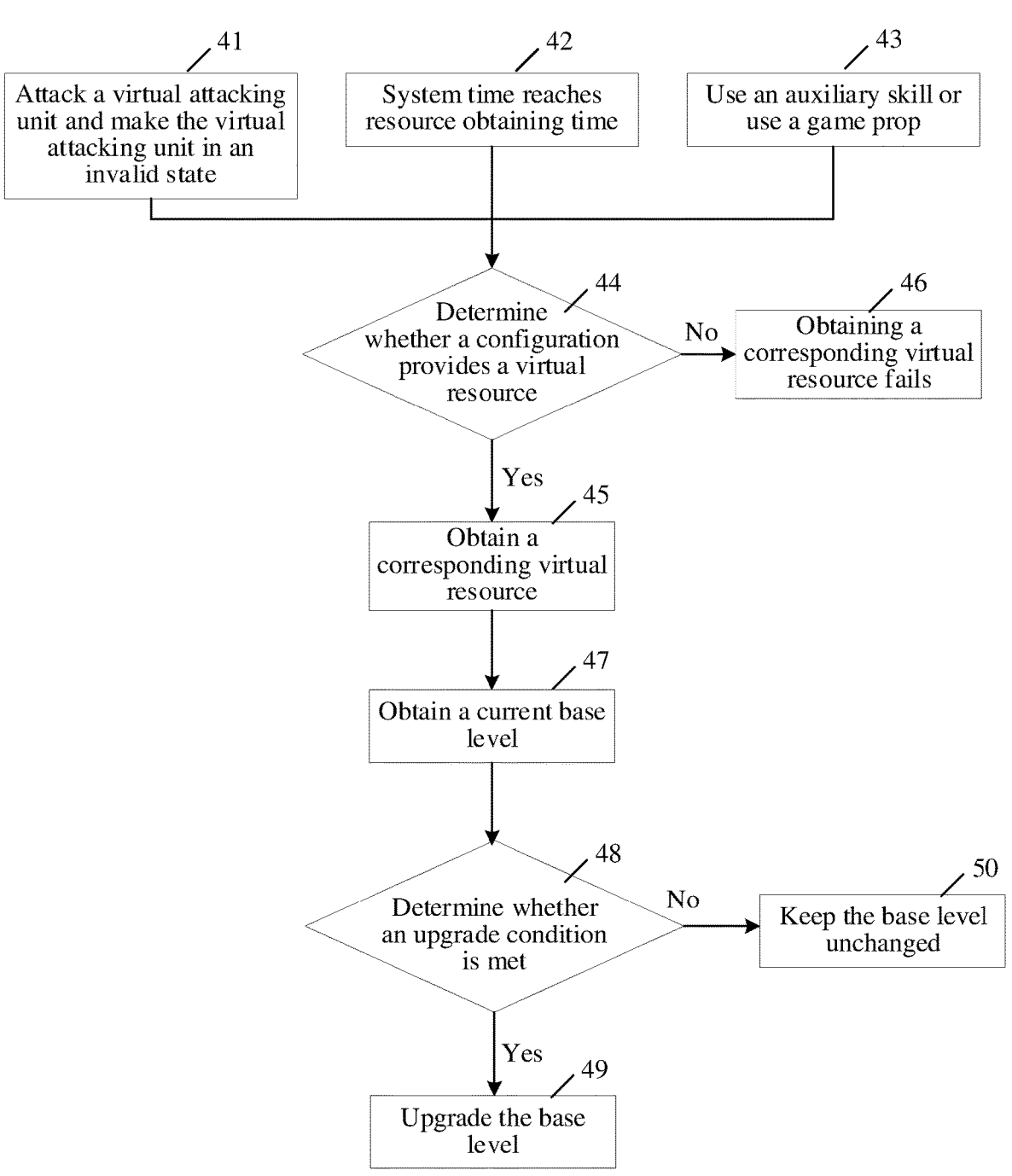
FIG. 17 is a system logic flowchart according to an embodiment of this application.

Further, for ease of understanding, referring to FIG. 17 together, FIG. 17 is a system logic flowchart according to an embodiment of this application. As shown in FIG. 17, the logical procedure may include the following step 41 to step 50. Step 41 and step 43 shown in FIG. 17 may refer to a condition for obtaining a virtual resource in a combat, and the condition for obtaining a virtual resource may specifically include:

Step 41: Attack a virtual attacking unit and make the virtual attacking unit in a health depleted state.

Specifically, the combat may include a virtual attacking unit. A user can obtain a virtual resource by attacking the virtual attacking unit and making the virtual attacking unit in a health depleted state.

Step 42: System time reaches resource obtaining time.

Specifically, when the system time reaches the resource obtaining time, the user can obtain a system virtual resource without any operation.

Step 43: Use an auxiliary skill or use a game prop.

Specifically, the combat may include an auxiliary skill control and a game prop (for example, a game resource prop and a game upgrade prop), and a corresponding virtual resource may be obtained by using the auxiliary skill and the game prop. An execution sequence of step 41 to step 43 is not limited in this application.

Step 44: Determine whether a configuration provides a virtual resource.

Specifically, after the user attacks the virtual attacking unit and makes the virtual attacking unit in a health depleted state, a terminal device may detect whether the virtual attacking unit is a valid virtual attacking unit (that is, whether the virtual attacking unit provides a virtual resource). Alternatively, after the user uses the game resource prop or the game upgrade prop, the terminal device may detect whether the game resource prop or the game upgrade prop is a valid prop (that is, whether the game resource prop or the game upgrade prop provides a virtual resource). Alternatively, when the resource obtaining time arrives, the terminal device may detect whether the resource obtaining time provides a virtual resource and a specific amount of the virtual resource when the virtual resource is provided. It may be understood that, if it is determined that a virtual resource is provided, subsequent step 45 may be performed. If it is determined that no virtual resource is provided, subsequent step 46 may be performed.

Step 45: Obtain a corresponding virtual resource.

Specifically, a virtual resource corresponding to the virtual attacking unit, a virtual resource corresponding to the game resource prop, or a system virtual resource corresponding to the resource obtaining time may be obtained.

Step 46: Obtaining a corresponding virtual resource fails.

Specifically, if it is determined that no virtual resource is provided, the terminal device cannot obtain the corresponding virtual resource, that is, the terminal device fails to obtain the virtual resource.

Step 47: Obtain a current base level.

Specifically, after the corresponding virtual resource is obtained, a building level (a base level) of a current camp virtual building and upgrade progress corresponding to the current building level may be obtained.

Step 48: Determine whether an upgrade condition is met.

Specifically, on the premise of the current upgrade progress, it may be determined whether the upgrade condition is met after the obtained virtual resource is added. If yes, subsequent step 49 may be performed. If not, the following step 50 may be performed.

Step 49: Upgrade the base level.

Specifically, if the upgrade condition is met, the building level may be correspondingly upgraded (and an extra virtual resource is used as progress of an updated level).

Step 50: Keep the base level unchanged.

Specifically, if the upgrade condition is not met, the building level can be kept unchanged.

It may be learned from the foregoing description that, for the virtual health value of the virtual attacking unit in one embodiment, the virtual health value may be determined according to the building level. A higher building level indicates a higher virtual health value of the virtual attacking unit. For example, when a building level of an opponent player is 6, a virtual health value of a virtual attacking unit of a player is lower than a virtual health value of the opponent player when the building level of the opponent player is 9.

In one embodiment, a camp virtual building in a combat may be associated with game difficulty level. A virtual health value of a virtual attacking unit may be determined based on a building level of a camp virtual building, and the virtual health value of the virtual attacking unit may represent game difficulty level. Therefore, current difficulty of a game may be intuitively presented in a manner of displaying the building level of the camp virtual building in a combat, and a game strategy can be formulated more conveniently and accurately by the player, thereby reducing the game threshold. That is, in one embodiment, game difficulty level may be quantified into a building level. By displaying the building level, the game difficulty level can be intuitively presented, and the game threshold is reduced.

Figure 18:
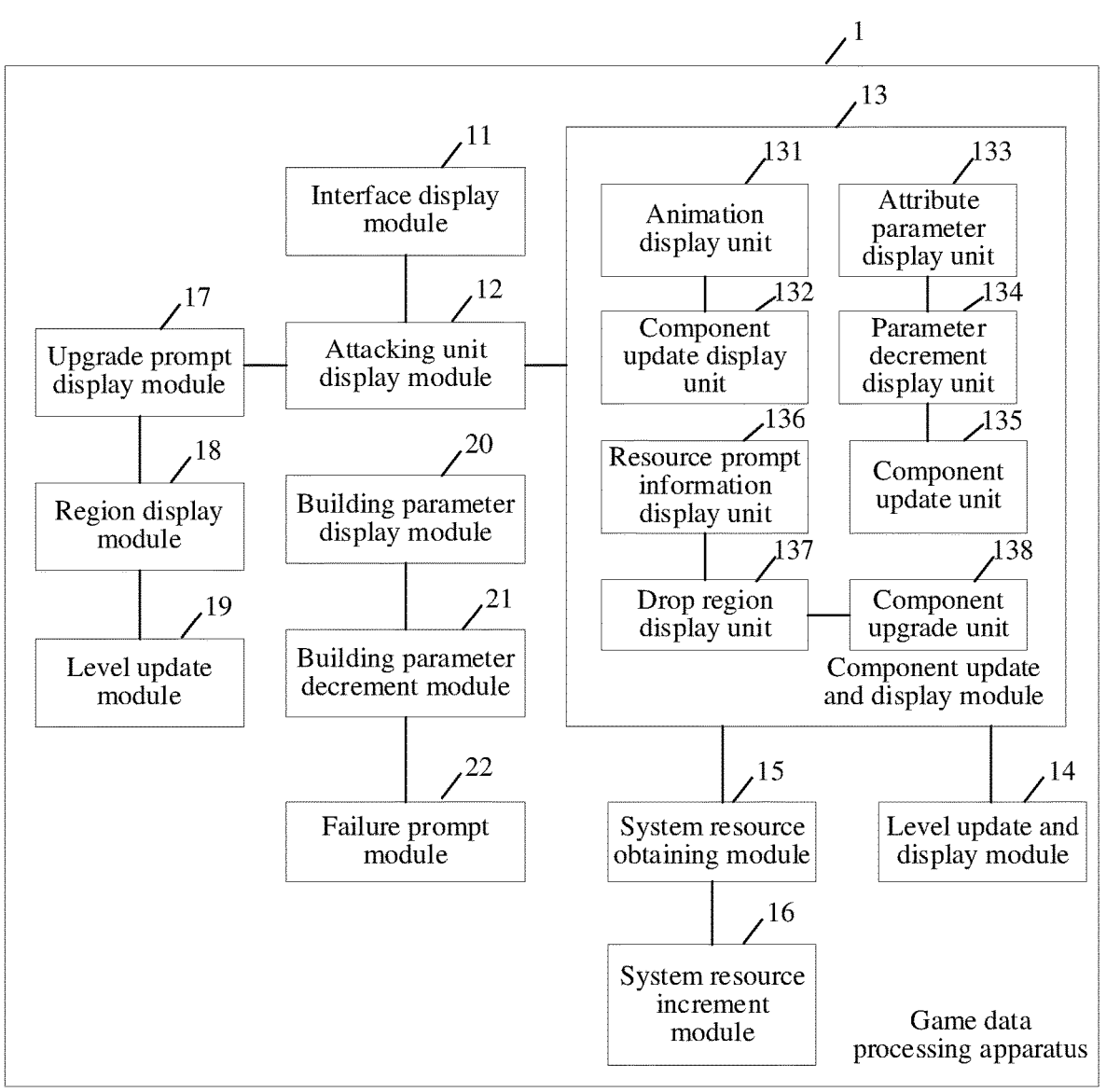
FIG. 18 is a schematic structural diagram of a game data processing apparatus according to an embodiment of this application.

Further, referring to FIG. 18, FIG. 18 is a schematic structural diagram of a game data processing apparatus according to an embodiment of this application. The game data processing apparatus may be a computer program (including program code) running in a computer device. For example, the game data processing apparatus is application software. The game data processing apparatus may be configured to perform the method shown in FIG. 3. As shown in FIG. 18, the game data processing apparatus 1 may include: an interface display module 11 and an attacking unit display module 12.

The interface display module 11 is configured to display a game interface; the game interface including a virtual building of a first camp, a first building level corresponding to the virtual building of the first camp, a virtual building of a second camp, a second building level corresponding to the virtual building of the second camp, and a first path; and the first building level being used for generating a first virtual attacking unit, the first virtual attacking unit being used for moving to the virtual building of the second camp along the first path, and the first virtual attacking unit being further used for attacking the virtual building of the second camp; and the attacking unit display module 12 is configured to: display, in the game interface, a second virtual attacking unit generated based on a first updated building level in response to the first building level upgrading to the first updated building level; the second virtual attacking unit being used for moving to the virtual building of the second camp along the first path, the second virtual attacking unit being further used for attacking the virtual building of the second camp, and a virtual health value of the second virtual attacking unit being higher than a virtual health value of the first virtual attacking unit.

For specific implementations of the interface display module 11 and the attacking unit display module 12, refer to descriptions of S101-S102 in the foregoing embodiment corresponding to FIG. 3. Details are not described herein again.

In an embodiment, the game interface further includes a second path, the second building level is used for generating a third virtual attacking unit, the third virtual attacking unit is used for moving to the virtual building of the first camp along the second path, and the third virtual attacking unit is further used for attacking the virtual building of the first camp; and the attacking unit display module 12 is further configured to: display, in the game interface, a fourth virtual attacking unit generated based on a second updated building level in response to the second building level upgrading to the second updated building level; the fourth virtual attacking unit being used for moving to the virtual building of the first camp along the second path, the fourth virtual attacking unit being further used for attacking the virtual building of the first camp, and a virtual health value of the fourth virtual attacking unit being higher than a virtual health value of the third virtual attacking unit.

In an embodiment, the game interface includes a first object display region associated with a target object and a second object display region associated with a contention object, the virtual building of the first camp is a camp virtual building of a camp to which the target object belongs, and the virtual building of the second camp is a camp virtual building of a camp to which the contention object belongs; the target object is used for attacking the third virtual attacking unit or the fourth virtual attacking unit, and the contention object is used for attacking the first virtual attacking unit or the second virtual attacking unit; both the virtual building of the first camp and the virtual building of the second camp are in an intermediate region, and the intermediate region refers to a common display region between the first object display region and the second object display region; the first path is in the second object display region, and the first path is a path from a first attacking unit generation position in the second object display region to the virtual building of the second camp; the first attacking unit generation position refers to a generation position of the first virtual attacking unit or the second virtual attacking unit; the second path is in the first object display region, and the second path is a path from a second attacking unit generation position in the first object display region to the virtual building of the first camp; and the second attacking unit generation position refers to a generation position of the third virtual attacking unit or the fourth virtual attacking unit.

In an embodiment, the game interface further includes an upgrade progress component corresponding to the first building level, and the upgrade progress component is used for representing a progress of upgrading from the first building level to the first updated building level; and the game data processing apparatus 1 may further include: a component update and display module 13 and a level update and display module 14.

The component update and display module 13 is configured to: update and display, in response to a resource obtaining operation for the virtual building of the first camp in the game interface, the upgrade progress component based on a virtual resource obtained by the resource obtaining operation.

The level update and display module 14 is configured to: update and display the first building level as the first updated building level in a case that the updated and displayed upgrade progress component meets a level update condition corresponding to the first building level, and execute the operation of displaying, in the game interface, a second virtual attacking unit generated based on a first updated building level in response to upgrading of the first building level.

For specific implementations of the component update and display module 13 and the level update and display module 14, refer to the description of S301-S302 in the embodiment corresponding to FIG. 3. Details are not described herein again.

In an embodiment, the component update and display module 13 may include: an animation display unit 131 and a component update display unit 132.

The animation display unit 131 is configured to: display, in response to the resource obtaining operation for the virtual building of the first camp in the game interface, a progress increment animation for the virtual resource in a component display region to which the upgrade progress component belongs; and the component update display unit 132 is configured to display, in the component display region, the upgrade progress component after progress increment update in a case that playback of the progress increment animation ends.

For specific implementations of the animation display unit 131 and the component update display unit 132, refer to the foregoing description of S301 in the embodiment corresponding to FIG. 3. Details are not described herein again.

In an embodiment, the game interface further includes a second path, the second building level is used for generating a third virtual attacking unit, the third virtual attacking unit is used for moving to the virtual building of the first camp along the second path, and the third virtual attacking unit is further used for attacking the virtual building of the first camp; and the resource obtaining operation in the game interface is an attack operation for the third virtual attacking unit; and the component update and display module 13 may include: an attribute parameter display unit 133, a parameter decrement display unit 134, and a component update unit 135.

The attribute parameter display unit 133 is configured to display an attacking unit attribute parameter of the third virtual attacking unit in the game interface;

the parameter decrement display unit 134 is configured to: perform, in response to an attack operation for the third virtual attacking unit, decrement display on the attacking unit attribute parameter of the third virtual attacking unit; and the component update unit 135 is configured to update and display the upgrade progress component based on a virtual resource corresponding to the third virtual attacking unit in a case that the third virtual attacking unit indicated by the attacking unit attribute parameter after decrement display is in a health depleted state.

For specific implementations of the attribute parameter display unit 133, the parameter decrement display unit 134, and the component update unit 135, refer to descriptions of S501-S503 in the foregoing embodiment corresponding to FIG. 7. Details are not described herein again.

In an embodiment, the component update unit 135 is further specifically configured to: obtain a valid attacking unit set in a case that the third virtual attacking unit indicated by the attacking unit attribute parameter after decrement display is in a health depleted state; the valid attacking unit set including N valid virtual attacking units that are allocated with virtual resources; and N being a positive integer;

the component update unit 135 is further specifically configured to detect the third virtual attacking unit based on the N valid virtual attacking units; and the component update unit 135 is further specifically configured to update and display the upgrade progress component based on a virtual resource corresponding to the third virtual attacking unit in a case that the N valid virtual attacking units include the third virtual attacking unit.

In an embodiment, the game interface further includes a resource prop display region used for displaying a game resource prop; the resource obtaining operation for the virtual building of the first camp in the game interface is a trigger operation for the game resource prop; and the component update and display module 13 may include: a resource prompt information display unit 136, a drop region display unit 137, and a component upgrade unit 138.

The resource prompt information display unit 136 is configured to display resource obtaining prompt information for the game resource prop in the game interface in response to displaying the game resource prop in the resource prop display region; the resource obtaining prompt information being used for prompting that after the game resource prop is used by a target object, the target object has a resource obtaining permission; and the target object being an object corresponding to the virtual building of the first camp.

The drop region display unit 137 is configured to: display a first drop region for the game resource prop in the game interface in response to a trigger operation for the game resource prop; the first drop region being a highlighted region associated with the first object display region; and the first object display region being a region in which the target object is located.

The component upgrade unit 138 is configured to update and display the upgrade progress component based on a virtual resource corresponding to the game resource prop in a case that the first drop region is in a building region range in which the virtual building of the first camp is located and the game resource prop is in the first drop region.

For specific implementations of the resource prompt information display unit 136, the drop region display unit 137, and the component upgrade unit 138, refer to descriptions of S701-S703 in the foregoing embodiment corresponding to FIG. 10. Details are not described herein again.

In an embodiment, the game interface further includes a second path, the second building level is used for generating a third virtual attacking unit, the third virtual attacking unit is used for moving to the virtual building of the first camp along the second path, and the third virtual attacking unit is further used for attacking the virtual building of the first camp; and the component update and display module 13 may be further specifically configured to: display an attack animation for the third virtual attacking unit in the game interface in a case that the first drop region is a path display sub-region in the first object display region, and the game resource prop is in the first drop region; the path display sub-region being a sub-region that is in the first object display region and that is used for displaying the second path; and the component update and display module 13 may be further specifically configured to update and display the upgrade progress component based on the virtual resource corresponding to the game resource prop in a case that playback of the attack animation ends.

In an embodiment, the component update and display module 13 may be further specifically configured to obtain a current upgrade virtual resource indicated by the upgrade progress component, and a required upgrade virtual resource for upgrading from the first building level to the first updated building level;

the component update and display module 13 may be further specifically configured to determine a difference required upgrade virtual resource according to the current upgrade virtual resource and the required upgrade virtual resource; and the component update and display module 13 may be further specifically configured to determine the virtual resource corresponding to the game resource prop according to the difference required upgrade virtual resource.

In an embodiment, the game interface further includes a skill prop display region used for displaying a game skill prop; the resource obtaining operation for the virtual building of the first camp in the game interface is a trigger operation for a target game skill prop in the skill prop display region; and the component update and display module 13 is further specifically configured to obtain a current total virtual asset of a target object, and determine a set of available game skill props based on the current total virtual asset; a consumable virtual asset corresponding to each available game skill prop in the set of available game skill props being less than the current total virtual asset;

the component update and display module 13 is further specifically configured to display, in the skill prop display region, the current total virtual asset, the set of available game skill props, and the consumable virtual asset corresponding to each available game skill prop in the set of available game skill props;

the component update and display module 13 is further specifically configured to display, in the game interface in response to a drag operation for a target game skill prop in the set of available game skill props, a skill animation corresponding to the target game skill prop; the drag operation being used for moving the target game skill prop from the skill prop display region to an object display sub-region; the object display sub-region being a sub-region in which a target object in the first object display region is located; and the target object being an object corresponding to the virtual building of the first camp; and the component update and display module 13 is further specifically configured to perform, in a case that playback of the skill animation ends, decrement display on the current total virtual asset based on a consumable virtual asset corresponding to the target game skill prop, and update and display the upgrade progress component based on a virtual resource corresponding to the target game skill prop.

In an embodiment, the game interface further includes a held skill prop display region used for displaying a held game skill prop;

the component update and display module 13 is further specifically configured to perform region detection on the held skill prop display region in response to a drag operation for the target game skill prop in the set of available game skill props; and the component update and display module 13 is further specifically configured to display, in a case that a vacant sub-region exists in the held skill prop display region, the target game skill prop in the vacant sub-region, and display the skill animation corresponding to the target game skill prop in the game interface.

In an embodiment, the game data processing apparatus 1 may further include: a system resource obtaining module 15 and a system resource increment module 16.

The system resource obtaining module 15 is configured to obtain, in a case that system time reaches resource obtaining time, a system virtual resource indicated by the resource obtaining time; and the system resource increment module 16 is configured to update and display the upgrade progress component based on the system virtual resource indicated by the resource obtaining time.

For specific implementations of the system resource obtaining module 15 and the system resource increment module 16, refer to the foregoing description of S201-S202 in the embodiment corresponding to FIG. 15. Details are not described herein again.

In an embodiment, the system resource obtaining module 15 is further specifically configured to obtain a resource mapping table in a case that the system time reaches the resource obtaining time; the resource mapping table including a mapping relationship between a configuration time interval set and a configuration virtual resource set, and a mapping relationship existing between one configuration time interval and one configuration virtual resource;

the system resource obtaining module 15 is further specifically configured to determine a configuration time interval to which the resource obtaining time belongs in the configuration time interval set as a target configuration time interval; and the system resource obtaining module 15 is further specifically configured to determine, as the system virtual resource indicated by the resource obtaining time, a configuration virtual resource that is in the configuration virtual resource set and that has a mapping relationship with the target configuration time interval.

In an embodiment, the game interface further includes an upgrade prop display region used for displaying a game upgrade prop.

The game data processing apparatus 1 may further include: an upgrade prompt display module 17, a region display module 18, and a level update module 19.

The upgrade prompt display module 17 is configured to display, in the game interface, the game upgrade prop and level upgrade prompt information for the game upgrade prop in a case that upgrade prop display time arrives; the level upgrade prompt information being used for prompting that after a target object uses the game upgrade prop, the virtual building of the first camp has a level upgrade permission; and the target object being an object corresponding to the virtual building of the first camp; and the region display module 18 is configured to display a second drop region for the game upgrade prop in the game interface in response to a prop use operation for the level upgrade prompt information; the second drop region being a highlighted key region associated with the first object display region; and the first object display region being a region in which the target object is located.

The level update module 19 is configured to update and display, in a case that the second drop region is in a building region range in which the virtual building of the first camp is located, and the game upgrade prop is in the second drop region, the first building level based on an increment level indicated by the game upgrade prop.

For specific implementations of the upgrade prompt display module 17, the region display module 18, and the level update module 19, refer to descriptions in the foregoing embodiment corresponding to FIG. 12. Details are not described herein again.

In an embodiment, the parameter decrement display unit 134 is further specifically configured to obtain, in response to an attack operation for the third virtual attacking unit, a single attack reduction amount corresponding to the attack operation;

the parameter decrement display unit 134 is further specifically configured to obtain a virtual health value corresponding to the third virtual attacking unit, and determine a proportion coefficient based on the single attack reduction amount and the virtual health value corresponding to the third virtual attacking unit;

the parameter decrement display unit 134 is further specifically configured to determine a single decrement amount of the attack operation for the attacking unit attribute parameter according to the proportion coefficient and the attacking unit attribute parameter; and the parameter decrement display unit 134 is further specifically configured to perform decrement display on the attacking unit attribute parameter of the third virtual attacking unit according to the single decrement amount.

In an embodiment, the parameter decrement display unit 134 is further specifically configured to obtain a unit type to which the third virtual attacking unit belongs;

the parameter decrement display unit 134 is further specifically configured to obtain a sign operation function corresponding to the unit type and a basic virtual health value corresponding to the third virtual attacking unit; and the parameter decrement display unit 134 is further specifically configured to determine the virtual health value corresponding to the third virtual attacking unit according to the sign operation function, the second building level, and the basic virtual health value.

In an embodiment, the game data processing apparatus 1 may further include: a building parameter display module 20, a building parameter decrement module 21, and a failure prompt module 22.

The building parameter display module 20 is configured to display an initial building attribute parameter for a camp virtual building in a combat;

the building parameter decrement module 21 is configured to perform decrement display on the initial building attribute parameter in a case that an attack behavior for the camp virtual building is detected; and the failure prompt module 22 is configured to display combat failure prompt information in the game interface in a case that the camp virtual building indicated by the initial building attribute parameter after decrement display is in an invalid state.

For specific implementations of the building parameter display module 20, the building parameter decrement module 21, and the failure prompt module 22, refer to descriptions in the foregoing embodiment corresponding to FIG. 16. Details are not described herein again.

In one embodiment, a camp virtual building in a combat may be associated with game difficulty level. A virtual health value of a virtual attacking unit may be determined based on a building level of a camp virtual building, and the virtual health value of the virtual attacking unit may represent game difficulty level. Therefore, current difficulty of a game may be intuitively presented in a manner of displaying the building level of the camp virtual building in a combat, and a game strategy can be formulated more conveniently and accurately by the player, thereby reducing the game threshold. That is, in one embodiment, game difficulty level may be quantified into a building level. By displaying the building level, the game difficulty level can be intuitively presented, and the game threshold is reduced.

Figure 19:
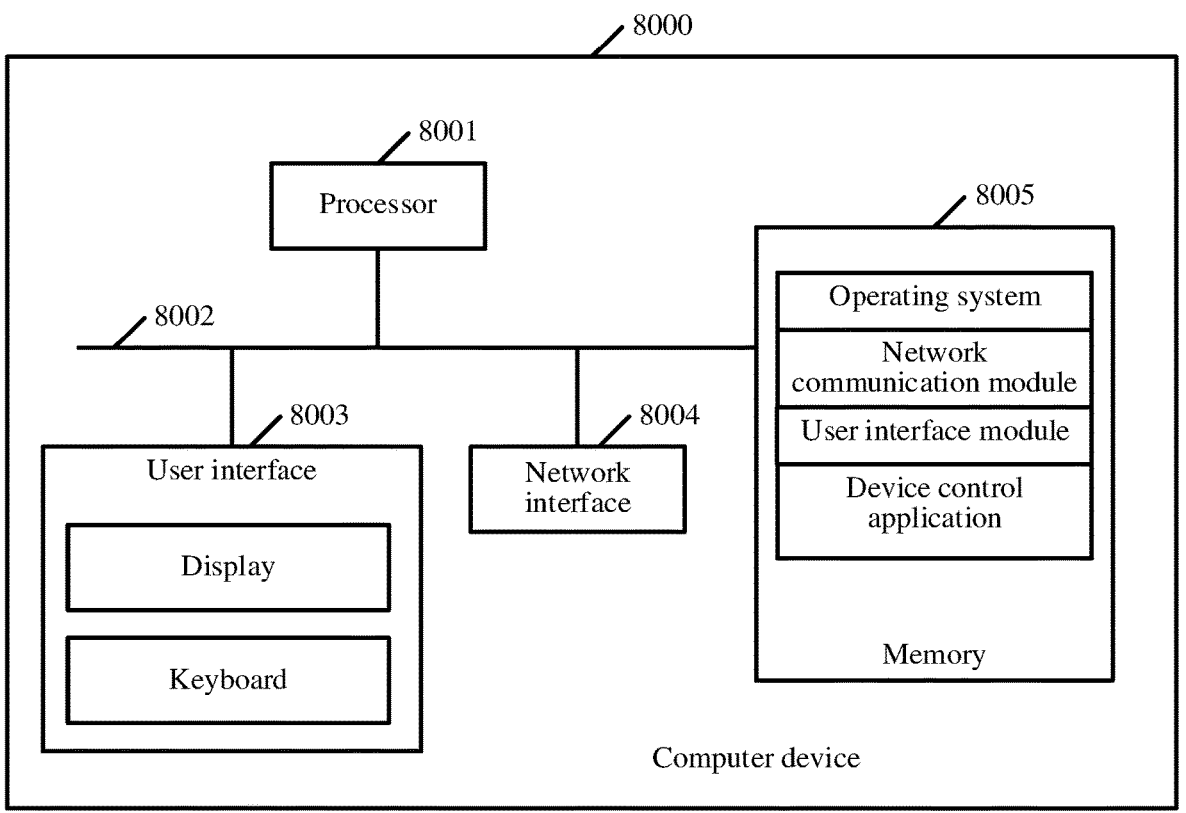
FIG. 19 is a schematic structural diagram of a computer device according to an embodiment of this application.

Further, referring to FIG. 19, FIG. 19 is a schematic structural diagram of a computer device according to an embodiment of this application. As shown in FIG. 19, the game data processing apparatus 1 in the foregoing embodiment corresponding to FIG. 18 may be applied to the foregoing computer device 8000, and the foregoing computer device 8000 may include: a processor 8001, a network interface 8004, and a memory 8005. In addition, the foregoing computer device 8000 further includes: a user interface 8003 and at least one communication bus 8002. The communication bus 8002 is configured to implement connection and communication between these components. The user interface 8003 may include a display and a keyboard. In some embodiments, the user interface 8003 may further include a standard wired interface and wireless interface. The network interface 8004 may in some embodiments include a standard wired interface and wireless interface (for example, a Wi-Fi interface). The memory 8005 may be a high-speed RAM memory, or may be a non-volatile memory, for example, at least one magnetic disk memory. In some embodiments, the memory 8005 may be at least one storage apparatus that is located far away from the foregoing processor 8001. As shown in FIG. 19, the memory 8005 used as a computer readable storage medium may include an operating system, a network communication module, a user interface module, and a device-control application program.

In the computer device 8000 shown in FIG. 19, the network interface 8004 may provide a network communication function. The user interface 8003 is mainly configured to provide an input interface for a user. The processor 8001 may be configured to invoke the device-control application program stored in the memory 8005 to implement:

displaying a game interface; the game interface including a virtual building of a first camp, a first building level corresponding to the virtual building of the first camp, a virtual building of a second camp, a second building level corresponding to the virtual building of the second camp, and a first path; and the first building level being used for generating a first virtual attacking unit, the first virtual attacking unit being used for moving to the virtual building of the second camp along the first path, and the first virtual attacking unit being further used for attacking the virtual building of the second camp when within a building attack range of the virtual building of the second camp;

displaying, in the game interface, a second virtual attacking unit generated based on a first updated building level in response to upgrading of the first building level; the first updated building level referring to a building level after the first building level is upgraded; the second updated building level referring to a building level after the second building level is upgraded; the fourth virtual attacking unit being used for moving to the virtual building of the first camp along the second path, the fourth virtual attacking unit being further used for attacking the virtual building of the first camp when within a building attack range of the virtual building of the second camp, and a virtual health value of the fourth virtual attacking unit being higher than a virtual health value of the third virtual attacking unit.

It is to be understood that the computer device 8000 described in one embodiment may perform the foregoing description of the game data processing method in the embodiments corresponding to FIG. 3 to FIG. 17, or may perform the foregoing description of the game data processing apparatus 1 in the embodiment corresponding to FIG. 18. Details are not described herein again. In addition, the description of beneficial effects of the same method are not described herein again.

In addition, an embodiment of this application further provides a computer readable storage medium. The computer readable storage medium stores a computer program executed by the computer device 1000 that processes data mentioned above, and the computer program includes program instructions. When the processor executes the program instructions, the processor can execute the foregoing description of the game data processing method in the embodiment corresponding to FIG. 3 to FIG. 17. Therefore, details are not described herein again. In addition, the description of beneficial effects of the same method are not described herein again. For technical details that are not disclosed in the computer readable storage medium embodiments of this application, refer to the descriptions of the method embodiments of this application.

The foregoing computer readable storage medium may be the game data processing apparatus provided in any one of the foregoing embodiments or an internal storage unit of the foregoing computer device, such as a hard disk or a memory of the computer device. The computer readable storage medium may also be an external storage device of the computer device, for example, a plug type hard disk, a smart media card (SMC), a secure digital (SD) card, and a flash card that are configured on the computer device. Further, the computer readable storage medium may further include an internal storage unit of the computer device and an external storage device. The computer readable storage medium is configured to store the computer program and other programs and data required by the computer device. The computer readable storage medium may be further configured to temporarily store data that has been or is to be output.

An aspect of this application provides a computer program product or a computer program, the computer program product or the computer program including computer instructions, the computer instructions being stored in a computer readable storage medium. A processor of a computer device reads the computer instructions from the computer readable storage medium, and the processor executes the computer instructions, so that the computer device performs the method provided in the aspect of the embodiments of this application.

The terms "first" and "second" in the specification, claims, and accompanying drawings of the embodiments of this application are used for distinguishing between different objects, and are not used for describing a specific sequence. In addition, the term "include" and any variant thereof are intended to cover a non-exclusive inclusion. For example, a process, method, apparatus, product, or device that includes a series of steps or units is not limited to the listed steps or modules; and instead, further In some embodiments includes a step or module that is not listed, or further In some embodiments includes another step or unit that is intrinsic to the process, method, apparatus, product, or device.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are executed in a mode of hardware or software depends on particular applications and design constraint conditions of the technical solutions. Those skilled in the art may use different methods to implement the described functions for each particular application, but such implementation is not to be considered beyond the scope of this application.

The method and the related apparatus provided in the embodiments of this application are described with reference to a flowchart and/or a schematic structural diagram of the method provided in the embodiments of this application. Specifically, each process and/or block of the method flowchart and/or the schematic structural diagram of the method may be implemented by a computer program instruction, and a combination of the process and/or block in the flowchart and/or block diagram. These computer program instructions may be provided to a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the schematic structural diagram. These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the schematic structural diagram. These computer program instructions may also be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the schematic structural diagram.

What is disclosed above is merely embodiments of this application, and certainly is not intended to limit the scope of the claims of this application. Therefore, equivalent variations made in accordance with the claims of this application shall fall within the scope of this application.

What is claimed is:

1. A game data processing method, performed by a terminal and comprising:

displaying a game interface comprising a first virtual building and a target object of a first camp and a second virtual building and a contention object of a second camp, wherein the target object and the contention object being respectively controlled by corresponding players, the first virtual building is of a first building level, and the second virtual building is of a second building level;

generating a first virtual attacking unit of the first camp corresponding to the first building level to attack the second virtual building;

generating a second virtual attacking unit of the second camp corresponding to the second building level to attack the first virtual building;

displaying, on the game interface, the second virtual attacking unit being attacked by the target object in response to a user operation on an attack control;

upgrading the first building level of the first virtual building in response to the second virtual attacking unit being eliminated; and generating an updated first virtual attacking unit of the first camp to attack the second virtual building based on the upgraded first building level.

2. The method according to claim 1, wherein the first virtual attacking unit moves along a first path to attack the second virtual building, and the second virtual attacking unit moves along a second path to attack the first virtual building.

3. The method according to claim 2, wherein the first virtual attacking unit has an attack range less than the length of the first path.

4. The method according to claim 2, further comprising:

displaying the contention object associated with the second virtual building on a side of the first path; and displaying the contention object attacking the first virtual attacking unit.

5. The method according to claim 4, wherein:

the first path, the first virtual attacking unit, the second virtual building, and the contention object are displayed in a first region of the user interface, and the second path, the second virtual attacking unit, the target object, and the first virtual building are displayed in a second region of the user interface.

6. The method according to claim 1, wherein an attribute of the second virtual attacking unit correlates to the second building level of the second virtual building.

7. The method according to claim 1, wherein upgrading the first building level of the second virtual building in response to the second virtual attacking unit being eliminated comprises:

increasing an experience point associated with the first virtual building in response to the second virtual attacking unit being eliminated; and upgrading the first building level after the experience point associated with the first virtual building reaching a threshold.

8. The method according to claim 1 further comprising:

casting a skill or prop in response to a user instruction to:

increase the first building level or an experiment point associated with the first virtual building; or attack the second virtual unit at a location of the user interface indicated by the user instruction.

9. The method according to claim 1 further comprising:

displaying a winning prompt for a user associated with the first virtual building when the second virtual building is destroyed by the first virtual attacking unit.

10. The method according to claim 1, wherein a virtual health value of the updated first virtual attaching unit is higher than a virtual health value of the first virtual attaching unit before upgrading the first building level of the first virtual building.

11. A computer device, comprising: one or more processors, a memory, and a network interface;

the processor being connected to the memory and the network interface, the network interface being configured to provide a network communication function, the memory being configured to store program code, and the one or more processors being configured to invoke the program code, so that the computer device performs:

displaying a game interface comprising a first virtual building and a target object of a first camp and a second virtual building and a contention object of a second camp, wherein the target object and the contention object being respectively controlled by corresponding players, the first virtual building is of a first building level, and the second virtual building is of a second building level;

generating a first virtual attacking unit of the first camp corresponding to the first building level to attack the second virtual building;

generating a second virtual attacking unit of the second camp corresponding to the second building level to attack the first virtual building;

displaying, on the game interface, the second virtual attacking unit being attacked by the target object in response to a user operation on an attack control;

upgrading the first building level of the first virtual building in response to the second virtual attacking unit being eliminated; and generating an updated first virtual attacking unit of the first camp to attack the second virtual building based on the upgraded first building level.

12. The computer device according to claim 11, wherein the first virtual attacking unit moves along a first path to attack the second virtual building, and the second virtual attacking unit moves along a second path to attack the first virtual building.

13. The computer device according to claim 12, wherein the first virtual attacking unit has an attack range less than the length of the first path.

14. The computer device according to claim 12, wherein the one or more processors are further configured to perform:

displaying the contention object associated with the second virtual building on a side of the first path; and displaying the contention object attacking the first virtual attacking unit.

15. The computer device according to claim 14, wherein:

the first path, the first virtual attacking unit, the second virtual building, and the contention object are displayed in a first region of the user interface, and the second path, the second virtual attacking unit, the target object, and the first virtual building are displayed in a second region of the user interface.

16. The computer device according to claim 11, wherein an attribute of the second virtual attacking unit correlates to the second building level of the second virtual building.

17. The computer device according to claim 11, wherein upgrading the first building level of the second virtual building in response to the second virtual attacking unit being eliminated comprises:

increasing an experience point associated with the first virtual building in response to the second virtual attacking unit being eliminated; and upgrading the first building level after the experience point associated with the first virtual building reaching a threshold.

18. The computer device according to claim 11, wherein the one or more processors are further configured to cast a skill or prop in response to a user instruction to:

increase the first building level or an experiment point associated with the first virtual building; or attack the second virtual unit at a location of the user interface indicated by the user instruction.

19. The computer device according to claim 11, wherein the one or more processors are further configured to perform:

displaying a winning prompt for a user associated with the first virtual building when the second virtual building is destroyed by the first virtual attacking unit.

20. A non-transitory computer readable storage medium, the computer readable storage medium storing a computer program, and the computer program being adapted to be loaded by more or more processors to perform:

displaying a game interface comprising a first virtual building and a target object of a first camp and a second virtual building and a contention object of a second camp, wherein the target object and the contention object being respectively controlled by corresponding players, the first virtual building is of a first building level, and the second virtual building is of a second building level;

generating a first virtual attacking unit of the first camp corresponding to the first building level to attack the second virtual building;

generating a second virtual attacking unit of the second camp corresponding to the second building level to attack the first virtual building;

displaying, on the game interface, the second virtual attacking unit being attacked by the target object in response to a user operation on an attack control;

upgrading the first building level of the first virtual building in response to the second virtual attacking unit being eliminated; and generating an updated first virtual attacking unit of the first camp to attack the second virtual building based on the upgraded first building level.

\* \* \* \* \*